United States Patent [19]

Houseman et al.

[11] Patent Number: 4,559,618
[45] Date of Patent: Dec. 17, 1985

[54] CONTENT-ADDRESSABLE MEMORY MODULE WITH ASSOCIATIVE CLEAR

[75] Inventors: David L. Houseman, West Chester, Pa.; Paul Bowden, Raleigh, N.C.

[73] Assignee: Data General Corp., Westborough, Mass.

[21] Appl. No.: 417,801

[22] Filed: Sep. 13, 1982

[51] Int. Cl.[4] .............................................. G11C 13/00
[52] U.S. Cl. ........................................ 365/49; 365/230
[58] Field of Search ................................... 365/49, 230

[56] References Cited

U.S. PATENT DOCUMENTS 3,997,882 12/1976 Goyal ...................................... 365/49
4,296,475 10/1981 Nederlof et al. .................. 365/49 X Primary Examiner—Joseph A. Popek
Attorney, Agent, or Firm—Gerald Cechony; Joel Wall

[57] ABSTRACT

A content-addressable memory module which performs an associative clear operation in response to a clear signal provided on a clear line. The associative clear operation simultaneously clears all registers in the content-addressable memory module whose contents match bits in a pattern input to the content-addressable memory module. A mask input along with the pattern determines which bits of the pattern are significant for the match. Each register in the content-addressable memory module has a bidirectional match line associated with it. A register's bidirectional match line carries a match signal only if that register contains data matching the pattern bits specified by the mask and the bidirectional match line is receiving a match signal from an external source. Clearing logic associated with each register clears the register when a clear signal appears on the clear line while the register's bidirectional match line is carrying a match signal. In content-addressable memories constructed of such content-addressable memory modules, memory match lines connect match lines associated with a number of registers. The memory match line and all of the match lines connected to it carry match signals only if each of the registers associated with the match lines contains data matching the pattern and mask input to the content-addressable memory module containing the register. The content-addressable memory module further contains logic allowing the use of encoded addresses to address individual registers in the content-addressable memory module.

38 Claims, 14 Drawing Figures

FIG. 3

CAM WITH STATUS REGISTERS 401

DATA AND MASK INPUTS 6183

FIG. 7 — ADDRESS DECODER 6066 TRUTH TABLE

| VALUES ON ADDRESS LINES | | | NAND GATES AND INPUT LINES | | | | | | | |
|---|---|---|---|---|---|---|---|---|---|---|
| A0 | A1 | A2 | 6064 (6033, 6035, 6037) | 6063 (6033, 6035, 6049) | 6061 (6033, 6047, 6037) | 6059 (6033, 6047, 6049) | 6057 (6045, 6035, 6037) | 6055 (6045, 6035, 6049) | 6053 (6045, 6047, 6037) | 6051 (6045, 6047, 6049) |
| 0 | 0 | 0 | o | — | — | — | — | — | — | — |
| 0 | 0 | 1 | — | o | — | — | — | — | — | — |
| 0 | 1 | 0 | — | — | o | — | — | — | — | — |
| 0 | 1 | 1 | — | — | — | o | — | — | — | — |
| 1 | 0 | 0 | — | — | — | — | o | — | — | — |
| 1 | 0 | 1 | — | — | — | — | — | o | — | — |
| 1 | 1 | 0 | — | — | — | — | — | — | o | — |
| 1 | 1 | 1 | — | — | — | — | — | — | — | o |

CONTENT-ADDRESSABLE MEMORY MODULE WITH ASSOCIATIVE CLEAR

BACKGROUND OF THE INVENTION

1. Field of the Invention

The present invention relates to memory circuits for use in digital computer systems and more specifically to content-addressable memory circuits.

2. Description of Prior Art

In the prior art, content-addressable memory modules (CAMMs) have been developed which perform match operations in addition to the read and write operations performed by standard memory circuits. In read and write operations, memory modules respond to addresses. In the read operation, an address is presented to the memory module and the memory module returns the data stored at that address; in the write operation, an address and data are presented to the memory module and the data is stored at the address.

In the match operation, on the other hand, an item of data is input to a CAMM, and if a matching item of data is contained in the CAMM, the CAMM indicates its location by activating a match line corresponding to the register containing the matching item of data. The degree of match required to activate the match line may be controlled by presenting a CAMM with mask bits as well as with the input data. Each mask bit corresponds to an input data bit; if the mask bit is set, the corresponding input data bit is ignored when data in the registers is compared with the item of data presented to the CAMM. Examples of such prior art CAMMs are the Intel(R) 3104, the Signetics 10155, and the Fairchild F100142. Such CAMMs are generally designed so that they may be easily combined together to form content-addressable memories (CAMs). A CAM has the same properties as a CAMM, except that a single CAM register is made up of a corresponding register from each of the CAMMs making up the CAM.

CAMs as described above may be used in digital computer systems to construct caches allowing fast access to frequently-used values by means of keys representing the values. For example, an operand in an instruction stream may contain information from which a memory address may be calculated. Once the memory address has been calculated, the memory address may be loaded into a cache and the operand may be used as a key to access the memory address in the cache. Such a cache may be constructed by combining a CAM with a fast-access memory. In the combination, each register of the fast-access memory may correspond to a register of a CAM, and a match line from the CAM register may serve to address the corresponding register of the fast-access memory. The CAM registers contain operands, and the corresponding registers of the fast-access memory contain the memory addresses corresponding to the operands. When an operand appears in the instruction stream, it is presented to the CAM. If the CAM contains the operand, the match line for the CAM register containing the operand becomes active and thereby addresses the corresponding register of the fast-access memory. The fast-access memory then responds by providing the memory address contained in the corresponding register. If the CAM does not contain the operand, a fault occurs to which the digital computer system responds by calculating the memory address represented by the operand and loading the operand into a CAM register and the memory address into the corresponding register of the fast-access memory.

The use of prior-art CAMs in applications such as that just described has been hindered by the amount of time required to clear the registers of prior-art CAMs. Such clearing is often necessary when a call or return operation is performed or when one process is removed from a processor and another loaded onto a processor. Such operations occur frequently in modern digital data processing systems, and the amount of time required to perform them has an important impact on overall system performance. In CAMs of the prior art, a register may be cleared only by performing a write operation to the register to be cleared. Thus, clearing an entire CAM requires separate write operations to each register in the CAM and clearing a CAM entry for a given operand requires presenting the operand to the CAM to obtain the address of the register containing the CAM and then performing a write operation to the register specified by the address.

The foregoing problem of the prior art and other problems as well are solved by the the invention described below.

SUMMARY OF THE INVENTION

The present invention provides a CAMM in which all registers which contain data matching a pattern input as modified by a mask input are simultaneously cleared when a clear signal is received in the CAMM. The mask input modifies the pattern input by specifying that certain bits of the pattern input be ignored when testing for a match between the pattern input and data stored in the registers. If the mask input specifies that all bits of the pattern input are to be ignored, all data contained in the registers matches the pattern input and all registers of the CAMM are simultaneously cleared on receipt of the clear signal.

The CAMM includes input lines for receiving data to be stored in the registers and the pattern input, mask input lines for receiving a mask, a clear line for receiving a clear signal, registers for storing data, and bidirectional match lines associated with each register for providing and receiving a match signal. The bidirectional match lines carry a match signal only when the register associated with the match line contains stored data matching the pattern input and the match line is simultaneously receiving a match signal from an external source.

The registers have three principal components: logic forming flip-flops for storing individual bits of data, match detection logic responsive to the data stored in the register, the data input lines, and the mask input lines for detecting a matching data item and providing a match signal to the bidirectional match line associated with the register, and clearing logic responsive to the clear line and the bidirectional match line for clearing the register in response to the simultaneous occurrence of a match signal on the bidirectonal match line and a clear signal on the clear line.

CAMMs of the present invention may be combined to form CAMs with the properties of the CAMM. In such CAMs, clear lines from the CAMMs making up the CAM are connected to a memory clear line and match lines from registers in the CAMMs are connected to memory match lines. A memory match line carries a match signal only if all match lines connected to the memory match line are providing match signals. Consequently, the match lines connected to a memory match line provide a match signal to the clearing logic only if the match detection logic of each register in the CAM register detects a match. CAMM registers whose match lines are connected to a common memory match line are therefore cleared only if each of the registers connected to the memory match line contain data matching the pattern input to the CAMM containing that register.

It is thus an object of the present invention to provide an improved digital computer system.

It is a further object of the present invention to provide an improved CAMM for use in digital computer systems.

It is another object of the present invention to provide a CAMM having an associative clear operation.

It is a still further object of the present invention to provide a CAMM wherein all CAMM registers may be simultaneously cleared.

It is yet another object of the present invention to provide a CAMM wherein a set of CAMM registers may be simultaneously cleared.

It is a yet further object of the present invention to provide a CAMM having encoded addressing.

It is still another object of the present invention to provide an improved CAM.

It is a yet further object of the present invention to provide a CAM having an associative clear operation.

It is a final object of the present invention to provide a CAM wherein sets of registers or the entire CAM may be simultaneously cleared.

Other objects, advantages, and features of the present invention will be understood by those of ordinary skill in the art after referring to the following detailed description of the preferred embodiment and drawings, wherein:

BRIEF DESCRIPTION OF THE DRAWINGS

FIG. 3 is a representation of the contents of a content addressable memory employing content-addressable memory modules having the properties of the present invention before and after a clear operation;

FIG. 7 is a truth table showing the decoding of the encoded addresses used in the TTL gate array implementation of FIG. 6.

DESCRIPTION OF THE PREFERRED EMBODIMENTS

1 Introduction

In the following description of the preferred embodiments of the present invention, content-addressable memories are first described in general. Next functional descriptions of a content-addressable memory module of the present invention and of content-addressable memories formed from content-addressable memory modules of the present invention are presented. Finally, a detailed implementation of a content-addressable memory module of the present invention is disclosed.

1.1 General Description of Content Addressable Memories

A content-addressable memory (CAM) is a memory which not only stores data, but also performs a match operation. In this operation, the CAM is given an item of data as input and if the CAM contains a matching item of data, i.e., one in which the values of certain bits are the same as that of corresponding bits of the item of data provided as input, the CAM indicates which register of the CAM contains the matching data. In many CAMs, a mask input selects the bits of the input data which are compared with the corresponding bits of the data contained in the CAM register. A data item stored in a CAM register matches the input data if the bits in the data item in the CAM register corresponding to the bits of the input data item selected by the mask input match the selected bits of the data input item. Other bits in the data item stored in the CAM do not affect the match.

1.2 CAMs of the Present Invention

Besides performing match operations with or without masking, CAMs of the present invention perform an associative clear operation. In a clear operation, all bits in a register of a CAM are set to 0; in an associative clear operation, all bits in a given register of a CAM are set to 0 if there is a match between the data input to a CAM as masked by the mask input and the contents of a given CAM register. Finally, CAMs of the present invention perform read and write operations like those of standard memories.

Figure 1:
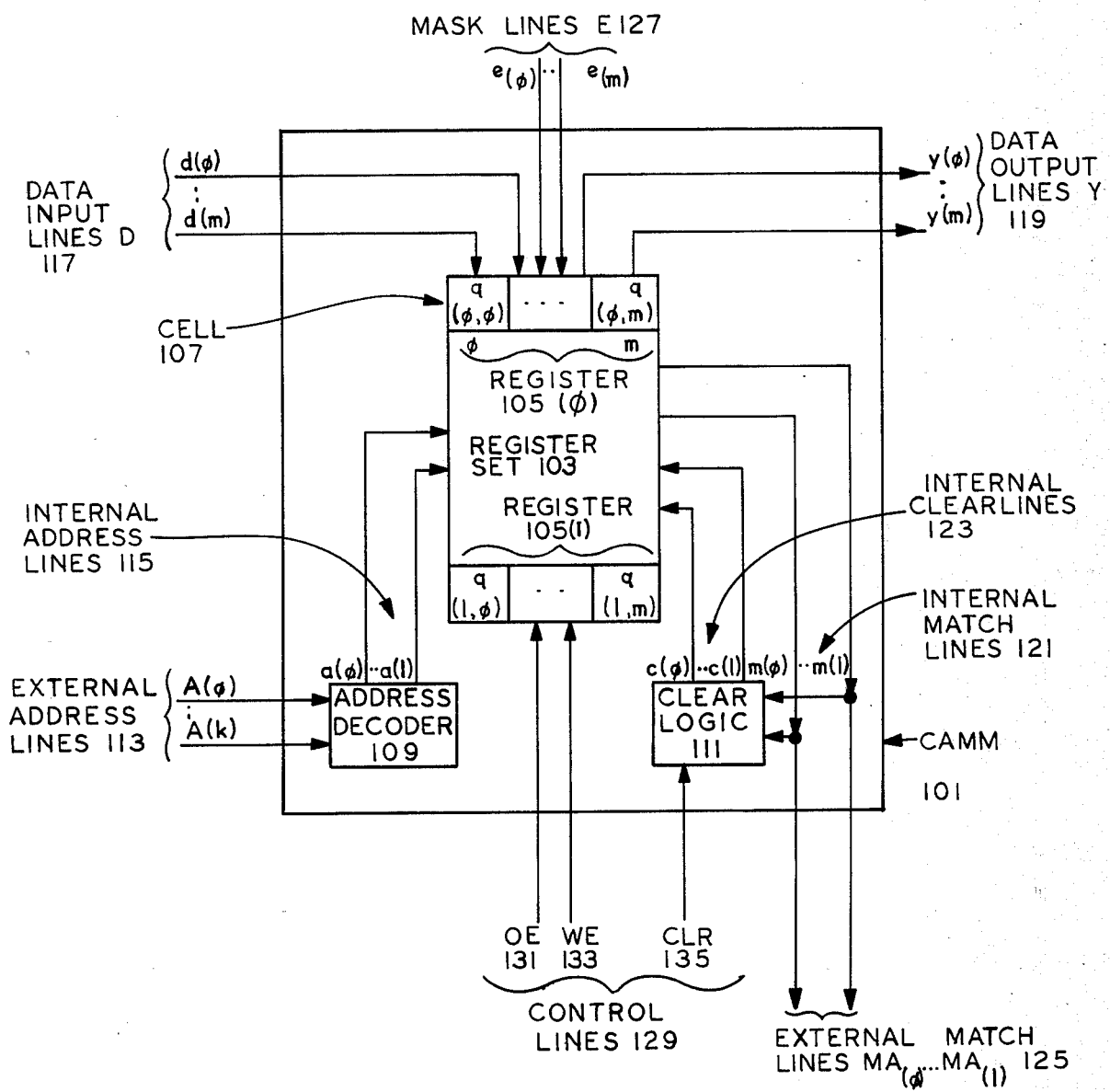
FIG. 1 is a block diagram showing an illustrative embodiment of a content-addressable memory module having the properties of the present invention.

2 Content-Addressable Memory Modules of the Present Invention—FIG. 1

A CAM of the present invention may include one or more CAM modules (CAMMs). Referring to FIG. 1, there is disclosed a block diagram of a single CAMM 101 of the present invention. CAMM 101 contains a plurality of registers 105 for storing data. CAMM 101 further receives inputs of data to be stored in registers 105 from data input lines 117, masking inputs from mask lines 127, addresses of registers 105 from external address lines 113, and control signals from control lines 129. Control lines 129 include output enable (OE) line 131 for enabling output of data fom CAMM 101, write enable (WE) line 133 for enabling the storage of data on data input lines 117 in CAMM 101, and clear (CLR) line 135 for enabling the associative clearing of registers 105. CAMM 101 provides outputs of data stored in registers 105 on data output lines 119. Finally, CAMM 101 both receives inputs and provides outputs on bidirectional external match lines 125. Each external match line 125 corresponds to a register 105 in CAMM 101 and a external match line 125 may be connected to external match lines 125 of other CAMMs 101. The input received on a external match line 125 for a given register 105 indicates whether the contents of registers 105 of other CAMMs 101 whose external match lines 125 are connected to the external match line 125 of a given CAMM register 105 match the data inputs to those CAMMS 101 as masked by the mask inputs. The output of an external match line 125 for a given register 105 indicates whether the contents of that register matches the data and mask inputs received by its CAMM 101.

3 Internal Structure of CAMM 101

Internally, CAMM 101 is made up of register set 103 consisting of registers 105, address decoder 109 for decoding addresses of registers 105 received on external address lines 113, internal address lines 115 for transmitting decoded addresses from address decoder 109 to registers 105, clear logic 111 for performing the associative clear operation, internal match lines 121 for transmitting match signals between registers 105, clear logic 111, and external match lines 125, and internal clear lines 123 for transmitting clear signals between clear logic 111 and registers 105.

Each register 105 consists of a plurality of cells 107 for storing a single bit of data. Each cell 107 in a given register 105 corresponds to a single data input line 117, a single data output line 119, and a single mask line 127. Thus, if each register 105 has 0 ... m cells 107, there are 0 ... m data input lines 117, data output lines 119, and mask lines 125. In FIG. 1, the plurality of data input lines 117 is indicated by d(0) ... d(m), the plurality of mask lines by e(0) ... e(m), and the plurality of data output lines by y(0) ... y(m). Data input line d(0) carries data to cell 107 (0) of a register 105 specified by an address on external address lines 113, data output line y(0) carries data from cell 107 (0) of a register 105 specified by an address, and mask line e(0) masks data input line d(0).

Each register 105 corresponds to a single internal address line 115, a single internal match line 121, and a single internal clear line 123. In FIG. 1, the plurality of registers 105 is indicated by r(0) ... r(1), the plurality of internal address lines 115 by a(0) ... a(1), the plurality of internal match lines 121 by m(0) ... m(1), the plurality of internal clear lines 123 by c(0) ... c(1), and the plurality of external match lines 125 by MA(o) ... MA(1). If i is in 0 ... 1, then internal address line 115 a(i), internal match line 121 m(i), internal clear line 123 c(i), and external match line 125 MA(i) all correspond to register r(i) 105. Further, a given cell 107 in registers 105 is indicated by q(i,j), where i specifies register 105 to which cell 107 q belongs and j specifies a single cell of 107 of cells 107 0 ... m in register i. Thus, cell 107 (0) of register 105 r(1) is specified by q(1,0).

Internal match line 121 m(i) and external match line 125 MA(i) are related as follows: if either is inactive, the other is also inactive. Internal match line 121 m(i) is inactive if its corresponding register 105 r(i) does not match the data on data input lines 117 as masked by the inputs on mask lines 125. The electrical properties of external match lines 125 are such that corresponding external match lines from a plurality of CAMMs 101 may be connected together; since each such connected external match line 125 MA(i) is inactive if its corresponding internal match line 121 m(i) is inactive, all such connected external match lines 125 MA(i) are inactive if any of the corresponding internal match lines 121 m(i) is inactive, and if an external match lines 125 MA(i) is inactive, all internal match lines 125 m(i) connected thereto are also inactive. In logical terms, therefore, the state of an external match line 125 MA(i) is the logical product of the states of all internal match lines 121 m(i) in the CAMMs 101 whose external match lines 125 are connected.

Clear logic 111 determines the state of an individual clear line 123 c(i) in response to external match line 125 MA(i) and CLR line 125. If external match line 125 MA(i) and CLR 135 are simultaneously active, clear logic 111 actives clear line 123 c(i), thereby setting cells 107 q(i,0 ... m) of register 105 r(i) to a value indicating a binary 0. As mentioned above, external match line MA(i) is active only if its corresponding internal match line m(i) is active. Where external match lines 125 MA(i) of a plurality of CAMMs 101 are connected together, therefore, no register 105 r(i) in any of the plurality of CAMMs 101 is cleared unless internal match lines m(i) 121 in all of the plurality of CAMMs 101 are active, that is, unless the contents of each register 105 r(i) in the plurality of CAMMs 101 matches the inputs on data input lines 117 as masked by mask lines 125 in that CAMM 101.

External address lines 113 consist of a plurality of address lines A(0) ... A(k) which transmit a binary encoded address specifying a register 105 to address decoder 109. Address decoder 109 decodes the address and activates internal address line 115 corresponding to register 105 specified on external address lines 113. For example, in a CAMM 101 with 8 registers 105, the external address lines 113 may consist of lines A(0) ... A(2) and internal address lines 115 may consist of lines a(0) ... a(7). The three external address lines 113 allow a binary representation of the integers 0 through 7 and address decoder 109 decodes this binary representation and activates internal address line 115 for register 105 specified by the integer represented by external address lines 113.

4 Operations Performed by CAMM 101

As mentioned above, CAMM 101 performs four operations: a read operation, a write operation, a match operation, and a clear operation. In a read operation, OE 131 is active, external address lines 113 specify a register 105 r(i), and data output lines 119 y(0) ... y(m) are set to the values of cells 105 q(i,0) ... q(i,m). In a write operation, WE 133 is active, external address lines 113 specify a register 105 r(i), and cells 105 q(i,0) ... q(i,m) are set to the values on data input lines 117 d(0) ... d(m).

In a match operation, WE 133 and CLR 135 are both inactive. The inputs are data on data lines 117 d(0) ... d(m) and mask enable signals on mask lines 127 e(0) ... e(m). If a mask line 127 e(j) is active, then the value of data line 117 d(j) is disregarded when testing for a match. If the contents of cells 107 q(i,0) ... q(i,m) for a given register 105 r(i) match all values on data lines 117 d(0) ... d(m) which are not masked by active mask lines 127, then internal match line 121 m(i) becomes active. In logical terms, this may be defined as follows:

$$m(i) = \mathop{P}_{j=0}^{m} [(q(i,j) \cdot d(j)) + e(j)]$$

where P is the logical product.

In the associative clear operation, finally, WE 133 is inactive and CLR 135 is active. As previously mentioned, if CLR 135 c(i), internal match line 121 m(i), and external match line 125 MA(i) are all active, match and clear logic 111 clears register r(i). Since external match line 125 MA(i) is active only if internal match lines 121 m(i) for all CAMMs 101 whose external match lines 125 MA(i) are connected together are active, a clear takes place only if there are matches for all CAMMs 101 whose external match lines 125 MA(i) are connected.

Figure 2:
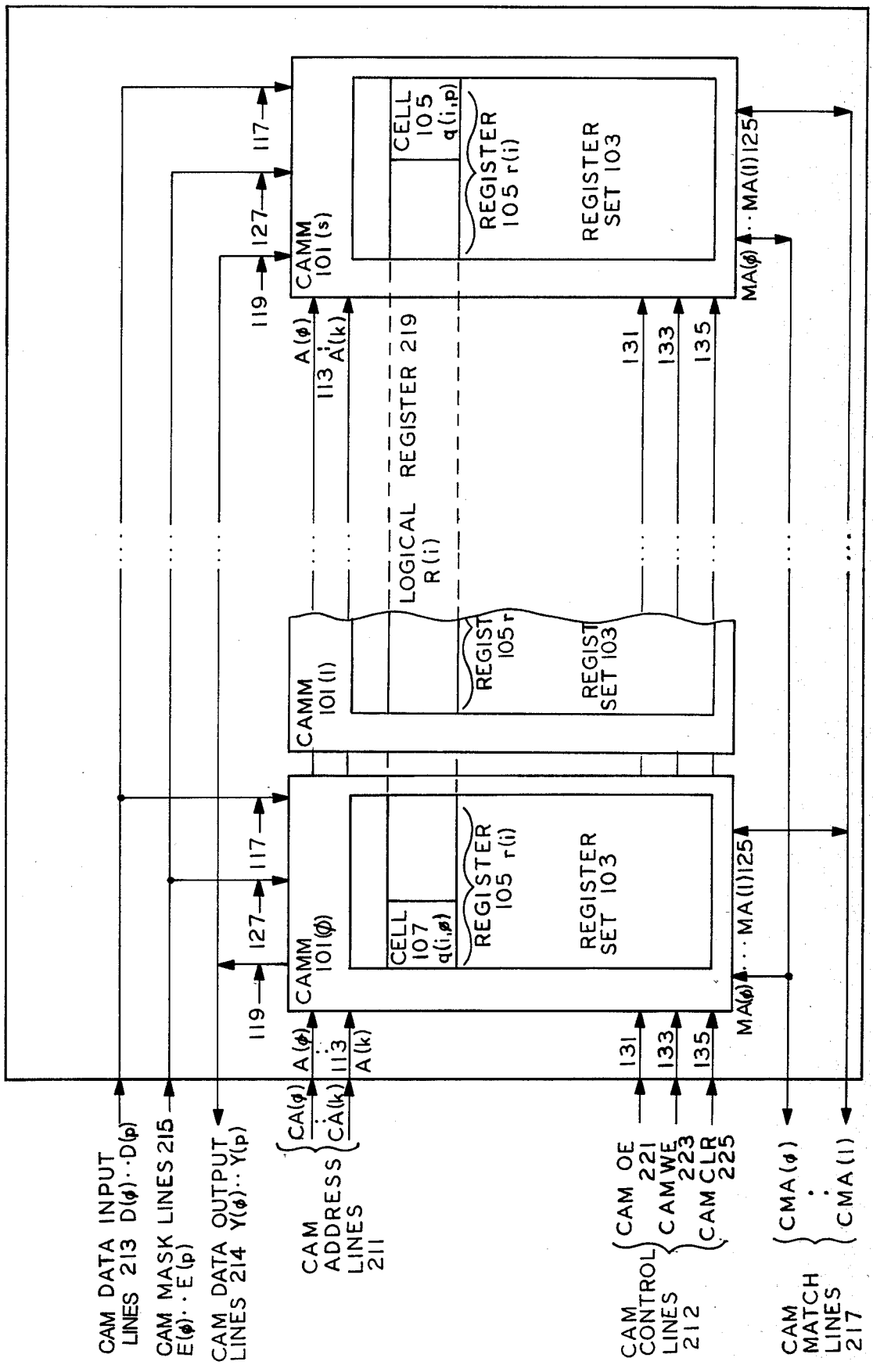
FIG. 2 is a block diagram showing an illustrative embodiment of a content-addressable memory module employing content-addressable memory modules having the properties of the present invention.

3 CAMs Composed of CAMMS 101—FIG. 2

In most applications, an individual CAMM 101 like the one just described is combined with other CAMMs 101 to make a CAM. FIG. 2 is a block diagram representing a CAM 201 made up of a plurality of CAMMs 101. Inputs to CAM 201 include data on CAM data input lines 213, masks on CAM mask lines 215, control signals on CAM control lines 211, and encoded addresses on CAM address lines 211. Outputs include data on CAM data output lines 214 and CAM match signals on CAM match lines 217.

4.3.1 Behavior of CAM 201

The behavior of CAM 201 is determined by the manner in which CAMMs 101 making up CAM 201 are connected by CAM address lines 211, CAM control lines 212, and CAM match lines 217. CAM address lines 211 CA(0) . . . CA(k) are connected to external address lines 113 A(0) . . . A(k) of all CAMMs 101 in CAM 201, and consequently, an address i on CAM address lines 211 specifies register 105 r(i) in all CAMMs 101 making up CAM 201. CAM control lines 212 consist of CAM OE line 221, connected to OE line 131 of all CAMMs 101 making up CAM 201, CAM WE line 223, connected to WE line 133 of all CAMMs 101 in CAM 201, and CAM CLR line 225, connected to CLR line 135 of all CAMMs 101 in CAM 201. As a consequence of these connections, when a CAM control line in CAM control lines 212 becomes active, its corresponding control line in control lines 129 in all CAMMs 101 making up CAM 201 becomes active. CAM match lines 217 CMA(0) . . . CMA(1), finally, are connnected to external match lines 125 MA(0) . . . MA(1) in all CAMMs 101 making up CAM 201. As previously explained, when external match lines 125 corresponding to a register 105 r(i) in a plurality of CAMMs 101 are connected together, a failure of the contents of a register 105 r(i) to match the values of register 205 r(i)'s data inputs 117 as masked by its mask inputs 125 deactivates its external match line 125 MA(i), and this in turn deactivates all external match lines 125 MA(i) connected to it. Consequently, CAM match line 217 CMA(i) is active only if for each register 105 r(i) in the group of CAMMs 101 forming CAM 201, the value of data inputs 117 as masked by mask inputs 127 of each register 105 r(i) matches the contents of that register 105 r(i).

As a result of these connections between CAMMs 101 making up CAM 201, corresponding registers 105 r(i) in CAMMs 101 making up CAM 201 behave as a single logical register 219 R(i), indicated by dashed lines in FIG. 2. if CAM 201 contains s CAMMs 101 and each register r(i) contains n cells 107, then logical register 219 R(i) contains sn cells 107. In FIG. 2 these cells are specified as cells 107 q(i,0) . . . q(i,p), where p=sn−1. Just as all registers 105 r(i) in CAMMs 101 making up CAM 201 form a logical register R(i) 219, so do all data input lines 117 in these CAMMs 101 form CAM data input lines 213, all data output lines 119 form CAM data output lines 214, and all mask lines 127 form CAM mask lines 215. There are as many CAM data input lines 213, CAM data output lines 214, and CAM mask lines 215 as there are cells 107 q in a logical register 219. In FIG. 2, the lines comprising CAM data input lines 213 are specified by D(0) . . . D(p), those comprising CAM data output lines 214 by Y(0) . . . Y(p), and those comprising CAM mask lines 215 by E(0) . . . E(p), where p=sn−1 as before.

4.3.2 Operations Performed by CAM 201

As a conseqence of the manner in which CAMMs 101 are connected to form CAM 201, all of the reading, writing, matching, and clearing functions performed by a CAMM 101 can be performed by CAM 201.

In a read operation, CAM OE line 221 is active and CAM address lines 211 specify an address. Consequently, control line OE 131 of each CAMM 101 is active, external address lines 113 of each CAMM 101 specify a corresponding register 105 r(i), and data output lines 119 are set to the values of the cells 105 making up register 105 r(i). Since all the registers 105 r(i) together make up logical register 219 R(i), and all of the data output lines together make up CAM data output lines 214, the result is to set CAM data output lines 214 Y(0) . . . Y(p) to the values of cells 105 q(i,0) . . . q(i,p) in logical register 219 R(i). Similarly, in the write operation, CAM WE line 223 is active, CAM address lines 211 specify an address, and cells 105 q(i,0) . . . q(i,p) in logical register 219 R(i) indicated by the address are set to the values of CAM data input lines 213 D(0) . . . D(p).

In a match operation, CAM data input lines 213 D(0) . . . D(p) specify the data to be matched with the contents of logical registers 219 and CAM mask lines 215 E(0) . . . E(p) specify which bits of the data are to be ignored in determining whether there is a match. Since CAM match line 217 CMA(i) corresponding to a logical register 219 R(i) connects all external match lines 125 MA(i) for registers 105 r(i) comprising logical register 219 R(i), CAM match line 217 CMA(i) and all external match lines 125 MA(i) are deactivated as previously described if the contents of any register 105 r(i) fail to match unmasked bits on CAM data input lines 213 corresponding to the cells 105 contained in register 105 r(i). The state of CAM match line 217 CMA(i) thus indicates whether the contents of logical register 219 R(i) match the data on CAM data input lines 213 D(0) . . . D(p). In logical terms, this may be expressed as follows:

$$CMA(i) = \overset{p}{\underset{j=0}{P}} [(q(i, j) \cdot d(j)) + e(j)]$$

where P is the logical product as before. As may be seen from the above equation, a match operation for a logical register 219 R(i) in CAM 201 is completely equivalent to a match operation for a register 105 r(i) in CAMM 101.

The behavior of the clear operation in CAM 201 is determined by the behavior of the match operation and by the fact that CLR lines 135 of all CAMMs 101 in CAM 201 are connected to CAM CLR line 225, and consequently, all CLR lines 135 are active when CAM CLR line 225 is active. As explained in the description of CAMMs 101, a register 105 r(i) is cleared only if CLR line 135 and external match line 125 MA(i) are both active. External match line 125 MA(i) for a register 105 r(i) in a logical register 219 R(i) is active only if internal match lines 121 m(i) for all registers 105 r(i) making up logical register 219 R(i) are active. Therefore, registers 105 r(i) making up logical register 219 R(i), and thus, logical register 219 R(i) itself, are cleared only if the contents of logical register 219 R(i) match the data on CAM data input lines 213 as masked by the input on CAM mask lines 215. As with the other operations, the clear operation on a logical register 219 R(i) is thus completely equivalent to the clear operation on a register 105 r(i).

Figure 3:
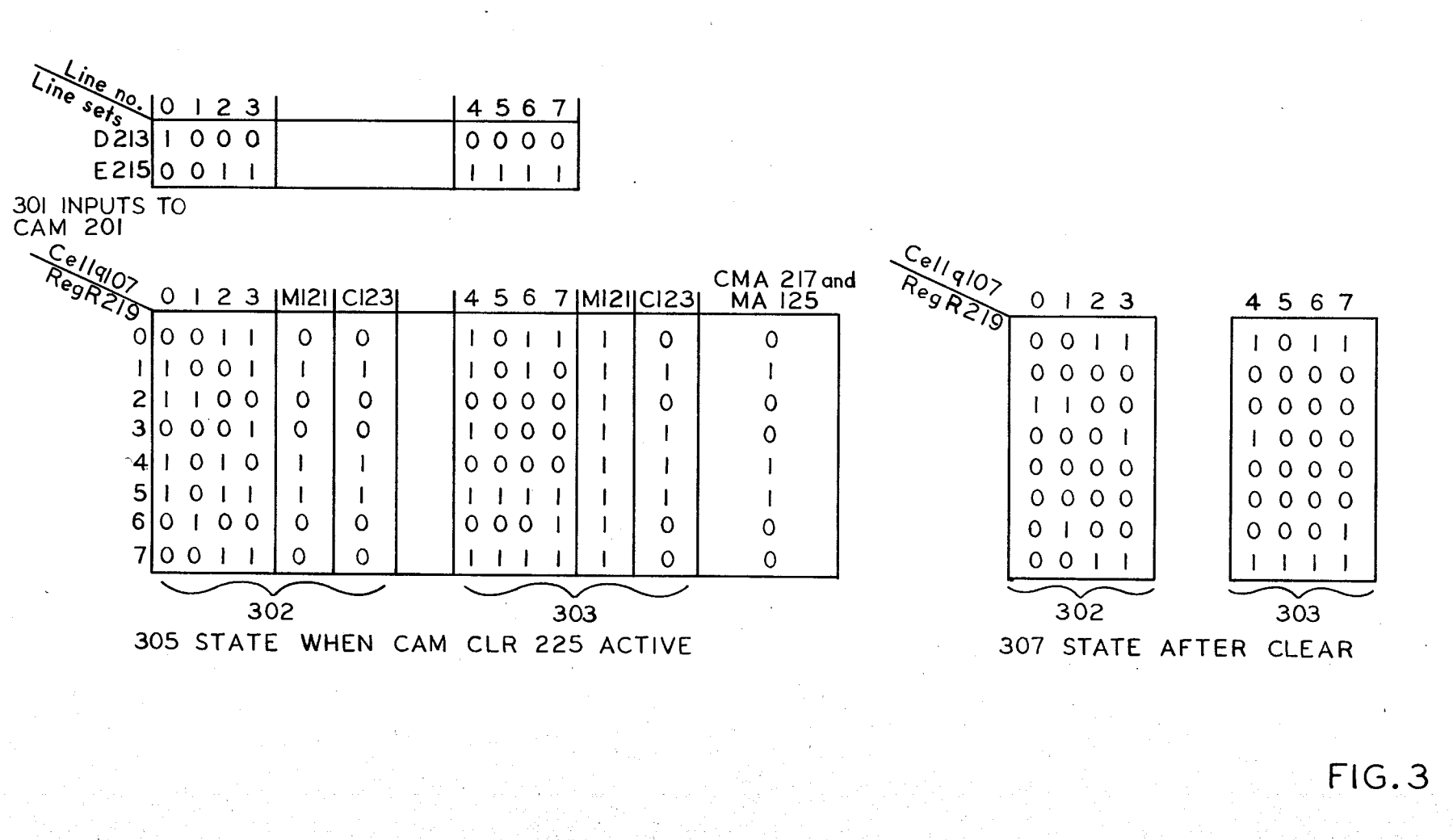

4.3.3 Example Match and Clear Operations—FIG. 3

A concrete example of a match operation and a clear operations in a CAM 201 is provided by FIG. 3. FIG. 3 shows the state of cells 107, CAM data input lines 213, CAM mask lines 215, internal match lines 121, internal clear lines 123, and CAM match lines 217 for a CAM 201 comprised of two CAMMs 101. Each CAMM 101 contains 8 4-bit registers 105, and consequently, CAM 201 of FIG. 3 contains 8 eight-bit logical registers 219. FIG. 3 represents CAM 201 as follows: Table 301 represents the inputs to CAM 201 at the time of the match and clear operations; row D corresponds to CAM data input lines 213, and row E corresponds to CAM mask lines 215; the columns specify individual CAM data input lines 213 and CAM mask lines 215. The value at the intersection of a row and a column specifies the value on the line specified by the column in the set of lines specified by the row.

Tables 305 and 307 show the state of CAM 201 before and after an associative clear operation. In these tables, part 302 represents the state of CAMM 101 0 and part 303 the state of CAMM 101 1 making up CAM 201. In tables 305 and 307, each row corresponds to a logical register 219 and the numbered columns correspond to cells 107. The value at the intersection of a row and a numbered column is thus the value of that cell 107 specified by the column number in logical register 219 specified by the row number. Table 305 further contains lettered columns; the letters heading these columns specify lines in CAMMs 101 corresponding to registers 105 making up logical registers 219 in CAM 201 and lines in CAM 201 itself. The letter M 121 specifies internal match lines 121, the letter C 123 specifies internal clear lines 123, the letters MA specify external match line 125, and the letters CMA specify CAM match lines 215. As previously explained, the state of a CAM match line 215 is the same as the state of the external match lines 125 connected to it. Again, the value at the intersection of a row and a lettered column is the state of the line specified by the letter corresponding to the register specified by the row.

Turning now to the operation illustrated in FIG. 3, the values of CAM mask lines 215 determine which values on CAM data input lines 213 are relevant to the match. In FIG. 3, CAM mask lines E(2) ... E(7) all have the value 1; consequently, any value in cells 107 q(i,2) ... q(i,7) produces a match when compared with the value on the corresponding line of CAM data input lines 213 D(2) ... D7) and only the values in cells 107 q(i,0) ... q(i,1) may fail to match when compared with the value of the corresponding data input line of data input lines 213 D(0) ... D(1). The effect of the masking can be seen in column m for CAMM 1 303. Since all CAM mask lines 215 corresponding to cells 107 contained in CAMM 1 303 are active, the contents of these cells are indifferent and all internal match lines 121 in CAMM 1 303 are active. In CAMM 0 302, on the other hand, only CAM mask lines 215 corresponding to cells 107 q(i,2) ... q(i,3) are active, and thus, the contents of cells 107 q(i,0) and q(i,l) are relevant to the match. As FIG. 3 shows, only in registers 105 (1), (4), and (5) do the contents of these cells match the values on the corresponding CAM data lines D(0) ... D(1), and only internal match lines 121 corresponding to these registers 105 are active.

Further, since all internal match lines 121 m(i) in registers 105 r(i) making up a logical register 219 R(i) must be active in order for the CAM match line 217 corresponding to a logical register 219 R(i) to be active, only CAM match lines 217 for logical registers 219 (1), (4), and (5) are active. Finally, an internal clear line 123 c(i) in CAMM 0 302 or CAMM 1 303 is active only if CAM CLR 225 is active and external match line MA (i) 125 is active. Since the state of external match line MA(i) 125 is identical with the state of CAM match line 217 to which it is connected and only CAM match lines 219 for logical registers (1), (4), and (5) are active, only those internal clear lines 123 in CAMM 0 302 and CAMM 1 303 are active which correspond to registers 105 making up logical registers 219 1, 4, and 5. As shown in Table 307 of FIG. 3, showing the state of the cells 107 in CAM 201 after the clear operation, all cells 107 making up these logical registers 219 have been set to 0.

The associative clear operation illustrated in FIG. 3 may be used to simultaneously clear all data having a certain type code from a CAM 201 while leaving data with other type codes undisturbed. For example, the leftmost two bits of the data stored in CAM 201 of FIG. 3 might be such a type code. In the example of FIG. 3, CAM mask lines 215 mask all bits but those containing the type code, and the unmasked CAM data input lines 213 have the value 10, specifying a type code. As apparent in FIG. 3, when CAM CLR line 225 is active, all CAM 201 logical registers 219 containing data with the type code 10 are cleared.

Figure 4:
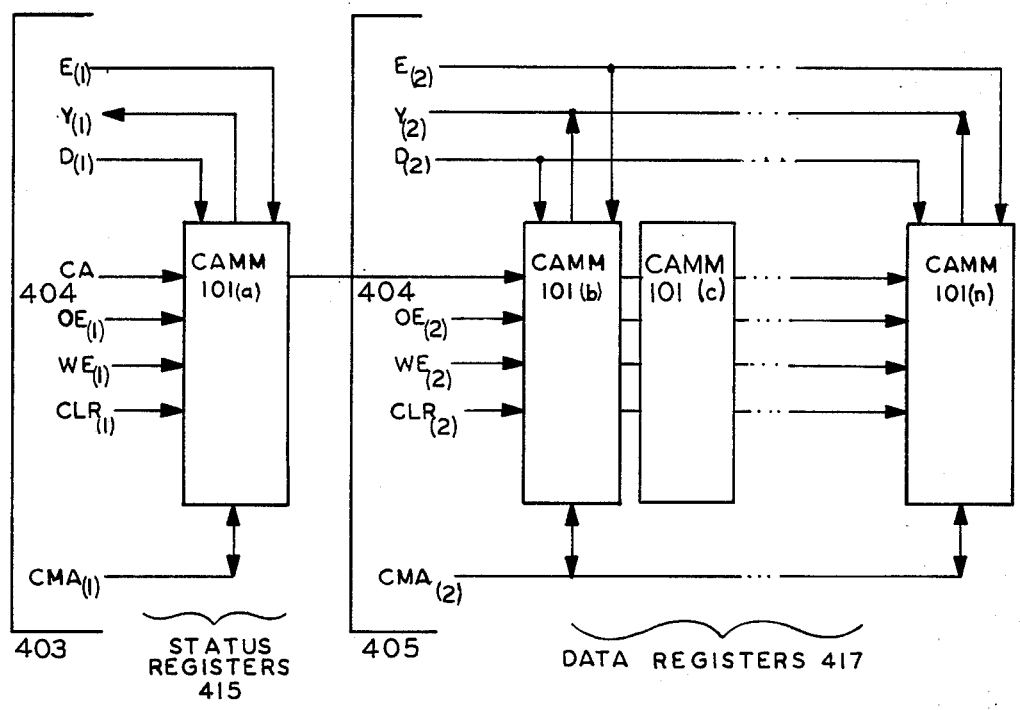
FIG. 4 is a block diagram showing a second illustrative embodiment of a content-addressable memory employing content-addressable memory modules having the properties of the present invention.

4.3.4 CAMs with Different Properties Formed from CAMMS 101—FIG. 4

By varying the manner in which CAMMs 101 are connected together, CAMs with differing properties may be formed. FIG. 4 presents an example of such a CAM, a CAM with status registers. CAM 401 has two main parts: status registers 415 and data registers 417. Data registers 417 contain data; each register in status registers 415 is associated with a data register 417 and contains status information about that data register 417. Status information might include a bit indicating that the contents of the associated data register 417 are valid or one indicating that the associated data register 417 is being loaded. The association of registers in status registers 415 with registers in data registers 417 is accomplished by connecting all CAMMs 101 in CAM 401 to common CAM address lines 404, whereby a single address refers either to a register in status registers 415 or the register in data registers 417 associated with it. The division of CAM 401 into two sets of registers is accomplished by connecting CAMMs 101 making up data registers 417 to one set 403 of CAM input, output, masking, control, and match lines and CAMM 101 making up status registers 415 to another set 405, thus making it possible to perform read, write, match, and clear operations independently on status registers 415 and data registers 417.

4.4 Implementation of a CAMM 101

The discussion now turns to an exemplary implementation of a CAMM 101. The exemplary implementation is presented merely for purposes of illustration; other implementations are possible which are capable of performing the same operations as the exemplary implementation and are thus equivalent to it. The exemplary implementation discussed herein uses TTL gate array technology. In this technology, all logic functions must be expressed by means of NAND gates and inverters. Because of the complexities introduced into the implementation by this constraint, it is advantageous to first discuss FIGS. 5 and 5A, which together present a simplified logic diagram for a single register of a CAMM 101. Thereupon, the discussion will turn to the exemplary implementation of CAMM 101 itself.

Figure 5:
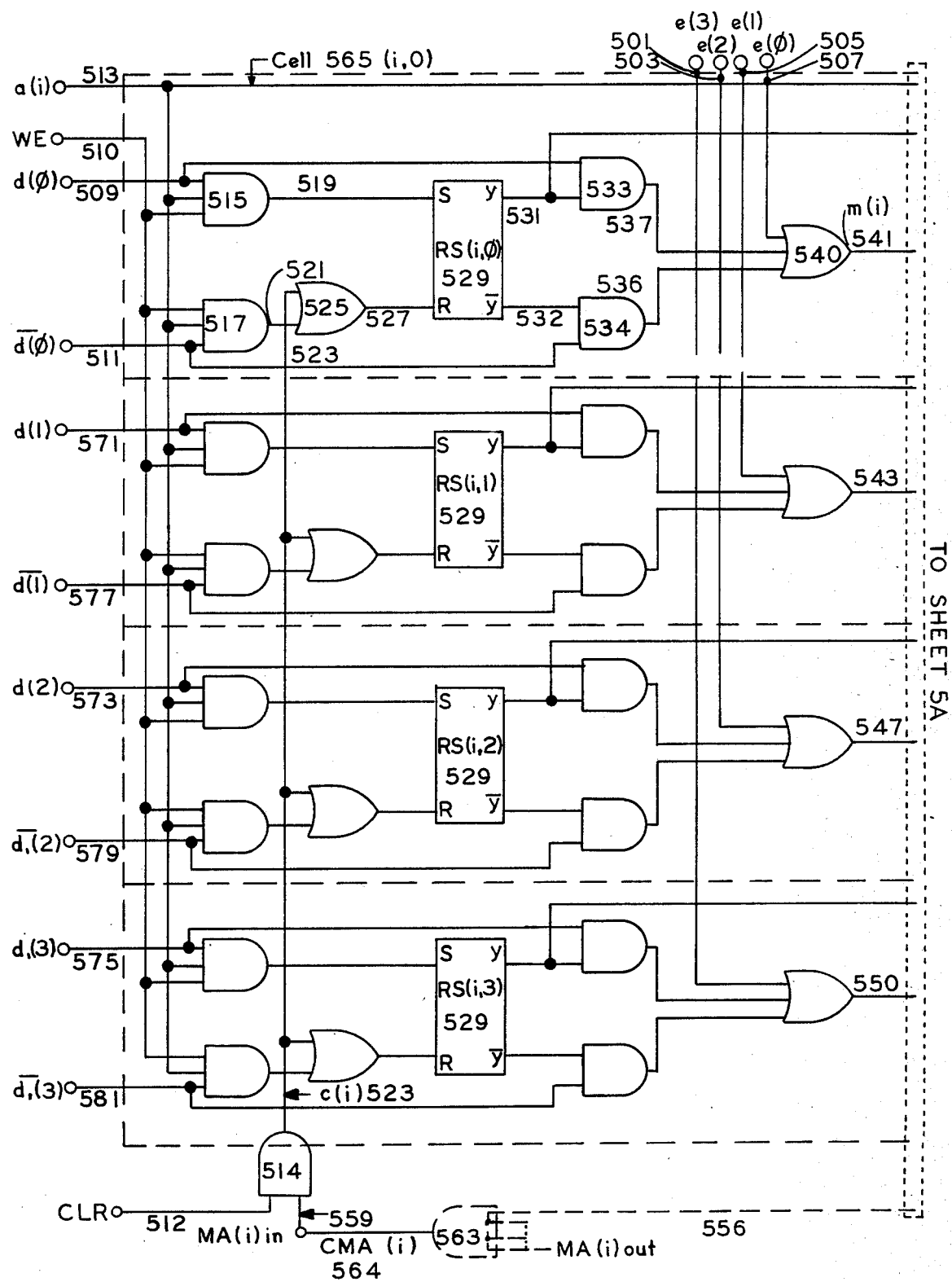
FIG. 5 and 5A are a simplified logic diagram of a single register of a preferred embodiment of the content-addressable memory module of the present invention.

4.4.1 Simplified Logic Diagram for a Single Register of a CAMM 101—FIG. 5

Figure 5A:
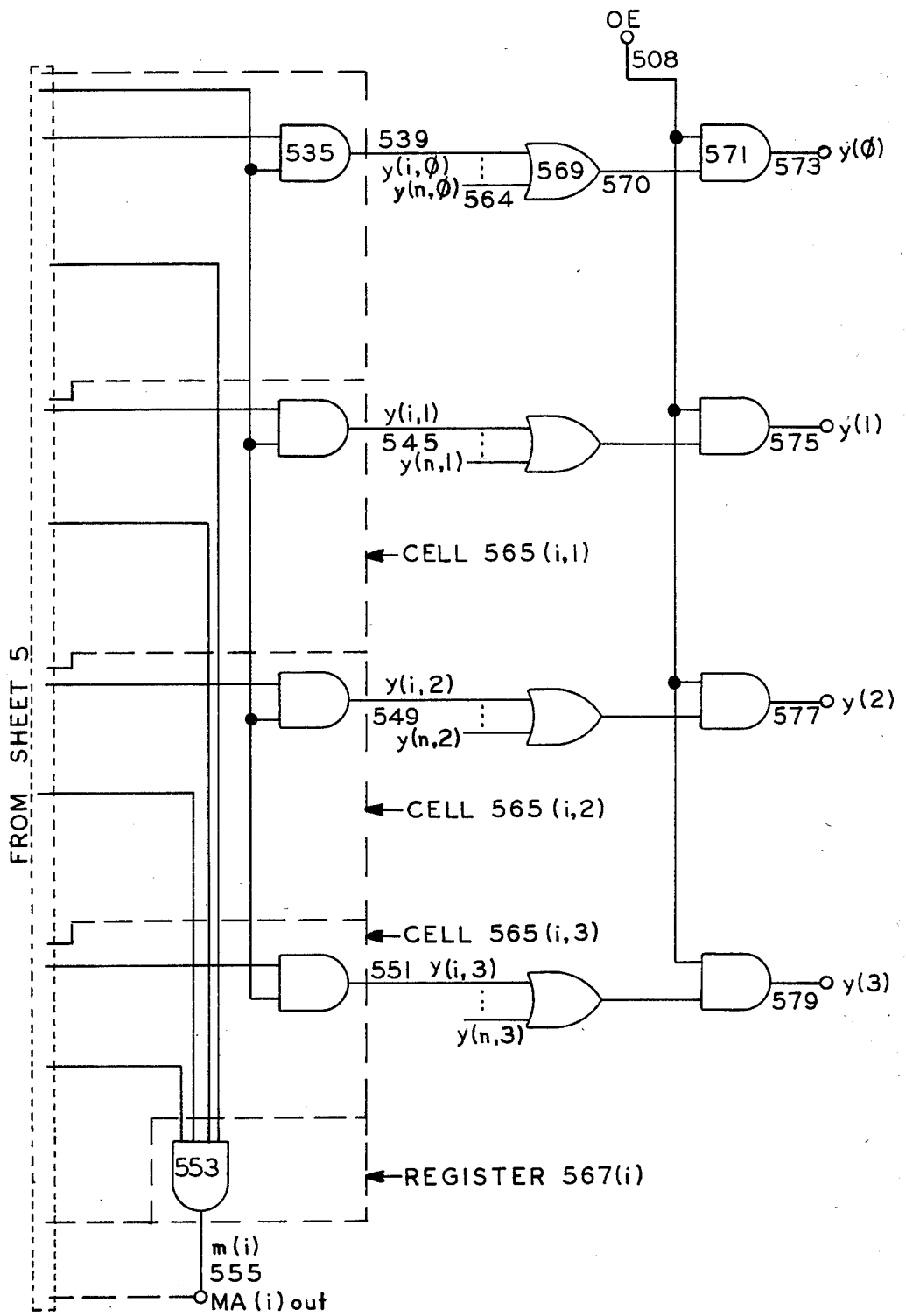

The logic diagram of FIGS. 5 and 5A employs AND gates, OR gates, and RS flip-flops, that is, flip-flops having an S input whose activation sets the flip-flop to 1, an R input whose activation sets the flip-flop to 0, a y output which has the value to which the flip-flop was last set, and a $\bar{y}$ output whose value is the complement of that of the y output. FIGS. 5 and 5A represent a single register 567 (i), outlined in dotted lines, and additional elements showing register 567 (i)'s relationship to the remainder of CAMM 101 to which it belongs. Register 567 (i) is functionally equivalent to register 105 r(i) of FIG. 1. Register 567 (i) is capable of storing four bits and consequently is made up of four cells 565 (i,0) . . . (i,3), equivalent to cells 107 q(i,0) . . . q(i,m) of FIG. 1.

4.4.1.1 Inputs and Outputs of Register 567 (i)

Inputs to register 567 (i) consist of: mask lines e(0) 501 through e(3) 507, corresponding to mask lines 127 e(0) . . . e(m) of FIG. 1; data input lines d(0) 509 and d(1) 571 through d(3) 575, corresponding to lines d(0) . . . d(m) of input data lines 117, data complement lines $\overline{d(0)}$ 511 and $\overline{d(1)}$ 577 through $\overline{d(3)}$ 581, carrying values which are the logical complement of the values on corresponding data input lines d(0) 509 and d(1) 571 through d(3) 575; OE line 508, corresponding to OE line 131, WE line 510, corresponding to WE line 133, internal clear line c(i) 523 corresponding to clear line c(i) of internal clear lines 123, and internal address line a(i) 513 corresponding to line a(i) of internal address lines 115.

Register 567 (i)'s outputs include register data output lines y(i,0) 539 through y(i,3) 551 and an external match line corresponding to line MA(i) of external match lines MA 125 in FIG. 1. As previously mentioned, external match lines MA 125 are bi-directional and may be connected to other external match lines MA 125. When so connected, an external match line MA 125 is active only if all other external match lines MA 125 connected to it are active. In FIG. 5, the bidirectional nature of the external match line and its relationship to corresponding match lines of other CAMMs 101 is expressed by representing the external match line for register 567(i) as two lines, MA(i)out 556 and MA(i)in 559. MA(i)out 556 is a continuation of internal match line m(i) 555; MA(i)in 559 is connected to CAM match line CMA(i) 564, corresponding to a line in CAM match lines 217 of FIG. 2. The relationship between lines MA(i)out 556, MA(i)in 559, and their equivalents in other CAMMs 101 is shown by means of wire AND gate 563 (in dotted lines). Inputs to gate 563 are lines MA(i)out for CAMMs 101 whose external match lines MA 125 are connected, its output is CAM match line CAM(i) 564, and MA(i)in 559's value is determined by the value of CAM match line CMA(i) 564.

4.4.1.2 Detailed Discussion of Cell 565 (i,0)

Since all cells 565 in register 567 (i) are identical, only cell 565 (i,0) is discussed in detail. Cell 565 (i,0)'s inputs are mask line e(0) 507, data input line d(0) 509, data complement line $\overline{d(0)}$ 511, internal address line a(i) 513, OE line 508, WE line 510, and internal clear line cl(i) 523. Cell 565 (i,0)'s outputs are cell match line m(i) 541 and cell output data line y(i,0) 539. The logical components of cell 565 (i,0) are: AND gate 515, receiving inputs from WE line 510, data line d(0) 509, and internal address line a(i) 513; AND gate 517, receiving inputs from WE line 510, data complement line $\overline{d(0)}$ 511, and internal address line a(i) 513; OR gate 525, receiving inputs from internal clear line c(i) 523 and AND gate 517; RS flip-flop RS(i,0) 529, receiving its S input from AND gate 515 and its R input from OR gate 525; AND gate 533, receiving inputs from data line d(0) 509 and the y output of RS flip-flop RS(i,0) 529; AND gate 534, receiving inputs from data complement line $\overline{d(0)}$ 511 and the $\bar{y}$ output of RS flip-flop RS(i,0); OR gate 540, receiving inputs from AND gates 533 and 534 and mask line e(0) 507; and AND gate 535, receiving inputs from internal address line a(i) 513 and the y output of RS flip-flop RS(i,0) 529.

4.4.1.3 Operations on Register 567 (i)

When read, write, match and associative clear operations are performed on the contents of register 567 (i), the components of cell 565 (i,0) interact as follows: In a write operation to register 567 (i) to which cell 565 (i,0) belongs, WE line 510 and internal address line a(i) 513 are both active. Consequently, the states of lines 519 and 521, carrying the outputs of AND gates 515 and 517 respectively, depend on whether data input line d(0) 509 is active. If it is, then data complement line $\overline{d(0)}$ 511 is inactive, line 519 is active, and line 521 is inactive. If data input line d(0) 509 is inactive, the reverse is true. Line 519 is connected to the S input of flip-flop RS(i,0) 529, and consequently, if line 519 is active, flip-flop RS(i,0) 529 is set to 1. Line 521 is connected to OR gate 523, which in turn is connected to the R input of flip-flop RS(i,0) 529. Therefore, if line 521 is active, flip-flop RS(i,0) 529 is reset to 0. Thus, after a write operation, the value at the y output of flip-flop RS(i,0) 529 is identical to the value represented on data input line d(0) 509 at the time of the write operation.

As FIG. 5 shows, internal address line a(i) 513 and WE line 510 are connected to other cells 565 in register 567 (i) in the same fashion as they are connected to cell 565 (i,0), and each of the other cells receives inputs from its equivalents to data input line d(0) 509 and data complement line $\overline{d(0)}$ 511 in the same fashion as cell 565 (i,0). Thus, at the end of a write operation, RS flip flops 529 (i,0 . . . 3) in register 567 (i) contain the values on data input lines d(0) 509 through d(3) 575.

In a read operation, internal address line a(i) 513 and OE line 508 are active. Internal address line a(i) 513 and line 531 from the y output of flip-flop RS(i,0) 529 serve as inputs to AND gate 535, whose output is cell data line 539 y(i,0). Thus, when internal address line a(i) 513 is active, the value of the y output of flip-flop RS(i,0) 529 determines the value of cell output data line 539. Cell output data line 539 is an input to OR gate 569, along with the equivalent lines from other registers 567. Thus, if cell output data line 539 is active, line 570, the output of OR gate 569, is active. Line 570 is one input to AND gate 571; the other input is OE line 508; consequently, when address line a(i) 513 and OE line 508 are active, cell data output line y(0) 573's value is determined by the value of the y output of flip-flop RS(i,0) 529. Since internal address line a(i) 513 and OE line 508 are connected in the same fashion in all cells 565 making up register (i) 567, the values at the y outputs of these registers' RS flip-flops (i,0 . . . 3) determine the values on data output lines y(0) 573 through y(3) 579. When a register is not being addressed, the outputs of the AND gates corresponding to AND gate 535 are inactive. Consequently, only the values in cells 565 (i,0 . . . 3) of the addressed register 567 (i) determine the values of data output lines y(0) 573 through y(3) 579.

In a match operation, the value at the y output of flip-flop RS(i,0) 529 is compared with the value on data input line d(0) 509 unless mask line e(0) 517 is active. When the operation is performed, the value at the y output of flip-flop RS(i,0) 529, carried on line 531, and the value on data input line d(0) 509 are both input to AND gate 533. At the same time the value of the $\bar{y}$ output of flip-flop RS(i,0) 529, carried on line 532, and the value on data complement line $\overline{d(0)}$ 511 are both input to AND gate 534. Consequently, if the value on data input line d(0) 509 matches the value at the y output, either line 537, the output of AND gate 533, or line 536, the output of AND gate 534, is active. Line 537 is active if data input line d(0) 509 and line 531, carrying the value of the y output, are both active, that is, if the data on data input line d(0) 509 and the data in flip-flop RS(i,0) both have the value 1, and line 536 is be active if data complement line $\overline{d(0)}$ 511 and line 532, carrying the value of the $\bar{y}$ output are both active, that is, if the data on data input line d(0) 509 and the data in flip-flop RS(i,0) 529 both have the value 0. Lines 536 and 537 are inputs to OR gate 540, and consequently, OR gate 540's output, line 541, is active if either line 536 or line 537 is active. If, on the other hand, the data on data input line d(0) 509 does not match the data in flip-flop RS(i,0) 529, neither AND gate 533 nor AND gate 534 has two active inputs, and output lines 537 and 536 are both inactive.

The third input to OR gate 540 is mask line e(0) 507. When data line d(0) 509 is being masked, mask line e(0) 507 is active and OR gate 540's output line 541 is active regardless of the values of lines 536 and 537, that is, regardless of whether data line d(0) 509 has the same value as flip-flop RS(i,0) 529. Line 541 and its equivalents from the other cells 565 in register 567 serve as inputs to AND gate 553, whose output is internal match line m(i) 555, corresponding to one of internal match lines 121. Consequently, internal match line m(i) 555 for a register (i) 567 is active only if all cell match lines for register (i) 567's cells are active.

The associative clear operation takes place when CLR line 512 is activated. If external match line MA(-i)in 559 is active when CLR line 512 is activated, cell (i,0) 565 is cleared. CLR line 512 and external match line MA(i)in 559 are inputs to AND gate 514, which has internal clear line c(i) 523 as its output. Internal clear line c(i) 523 provides an input to OR gate 525, whose output is connected via line 527 to the R input of flip-flop RS(i,0) 529. Thus, when CLR line 512 and external match line MA(i)in 559 are active, internal clear line c(i) 523 is active, line 527 is active, and flip-flop RS(i,0) is set to 0. Since internal clear line c(i) 523 is connected as described above to all other cells 565 in register (i) 567, all cells 565 in register (i) 567 are cleared simultaneously with cell (i,0) 565. As previously mentioned, an external match line MA(i) 125 is active only if all other external match lines MA(i) 125 from other CAMMs 101 connected to it are active, and thus, if an associative clear operation may be performed on register (i) 567, it may be performed on corresponding registers 567 whose external match lines are connected to register (i) 567.

4.5 A TTL Gate Array Implementation of CAMM 101—FIGS. 6 and 6A through 6F

Figure 6:
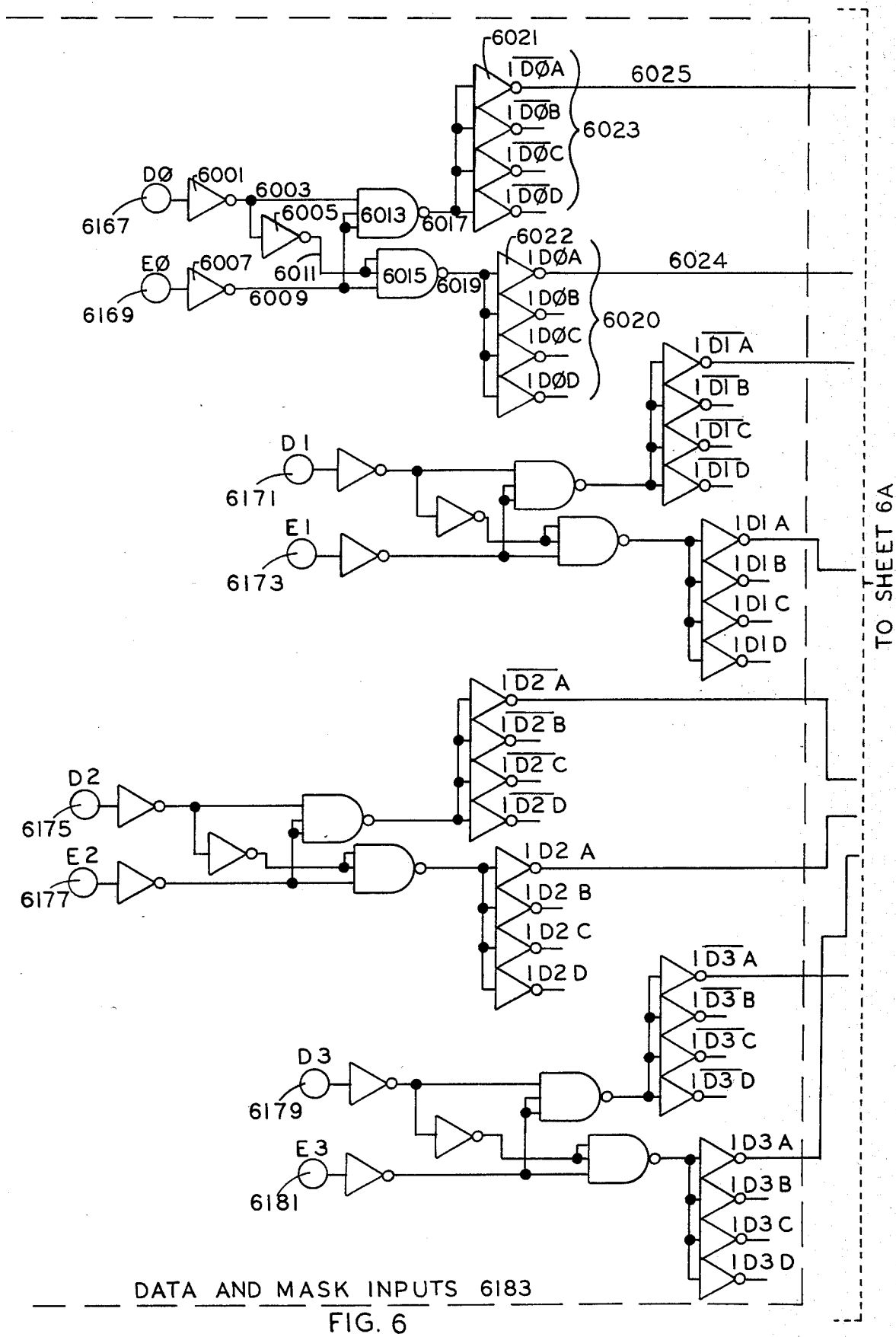
FIGS. 6 and 6A through 6F together make up a complete logic diagram of a TTL gate array implementation of a preferred embodiment of a content-addressable memory module of the present invention.

FIGS. 6 and 6A through 6F together contain a logic diagram for an exemplary TTL gate array implementation of an eight-register by four-bit CAMM 101. The form of the logic in this implementation is dictated by logical and electrical characteristics of the TTL gate array. The only logical devices which may be formed from the gate array are NAND gates and inverters. Further, each NAND gate must have three inputs and a given NAND gate or inverter can drive a maximum of four other NAND gates or inverters. In FIG. 6, only the cells of a single register are shown in detail; cells of remaining registers are represented as boxes with labelled inputs and outputs; the cells and registers so represented are, however, identical to the cells and register shown in detail.

4.5.1 Inputs and Outputs of the TTL Gate Array Implementation

Figure 6A:
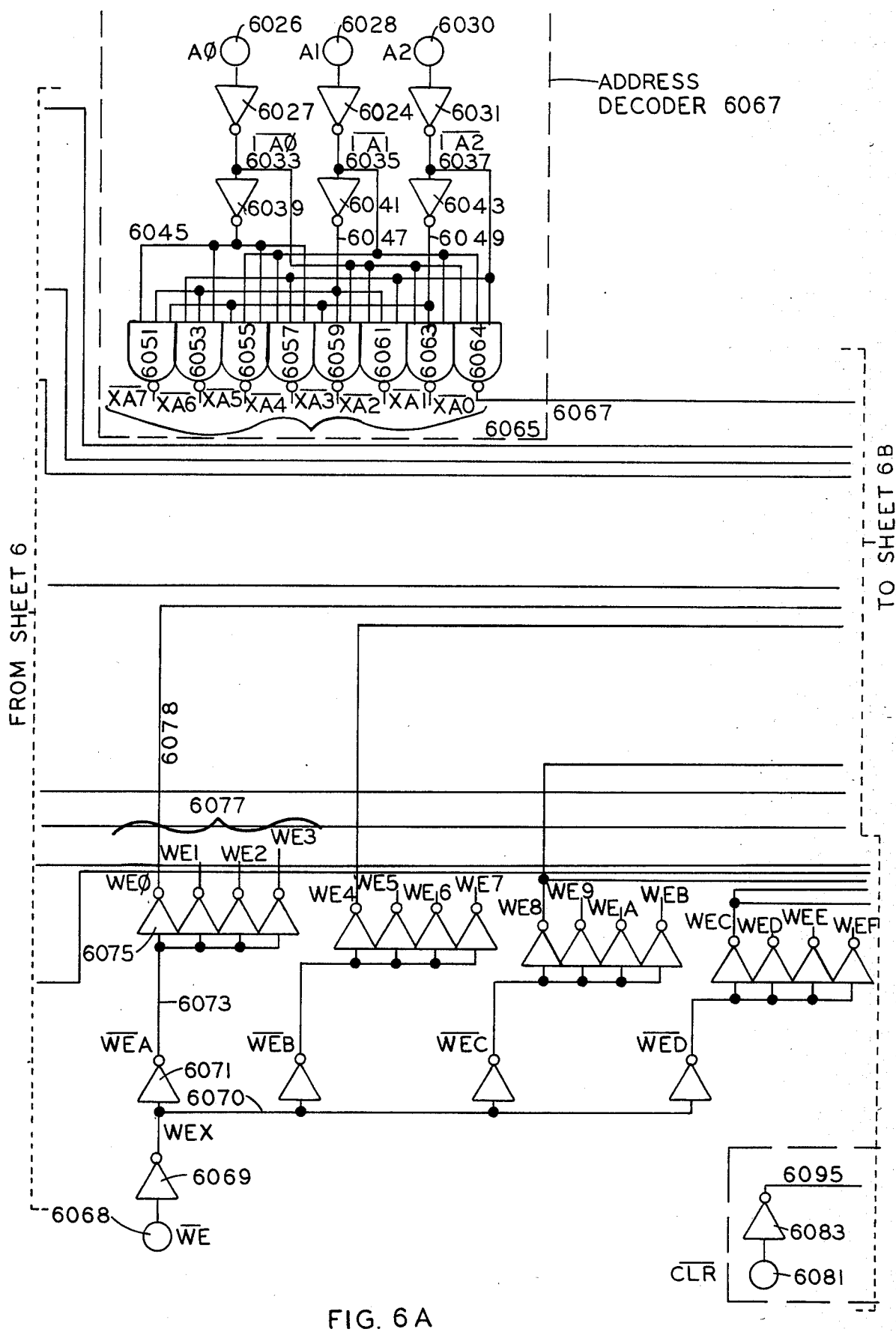
Figure 6B:
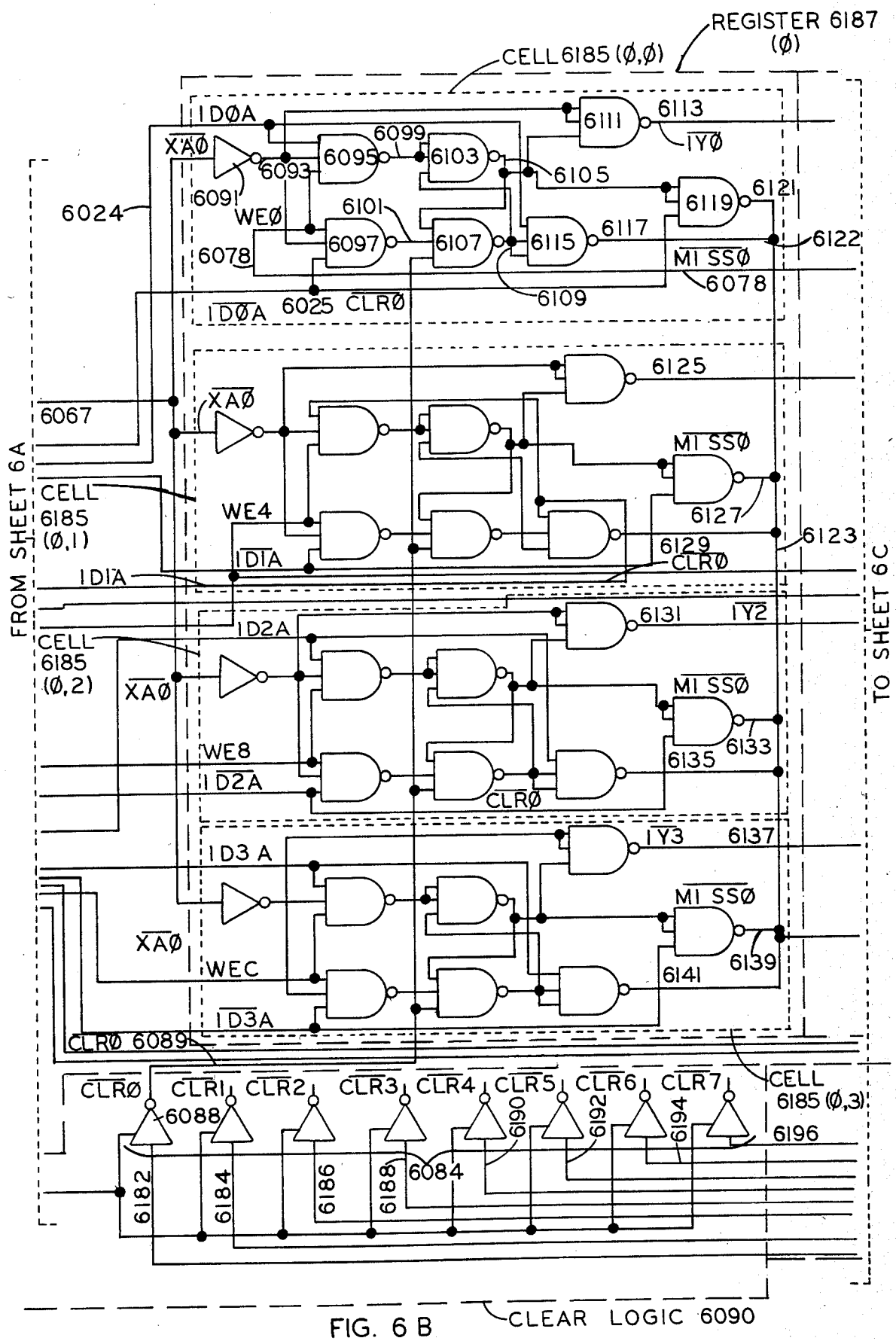
Figure 6C:
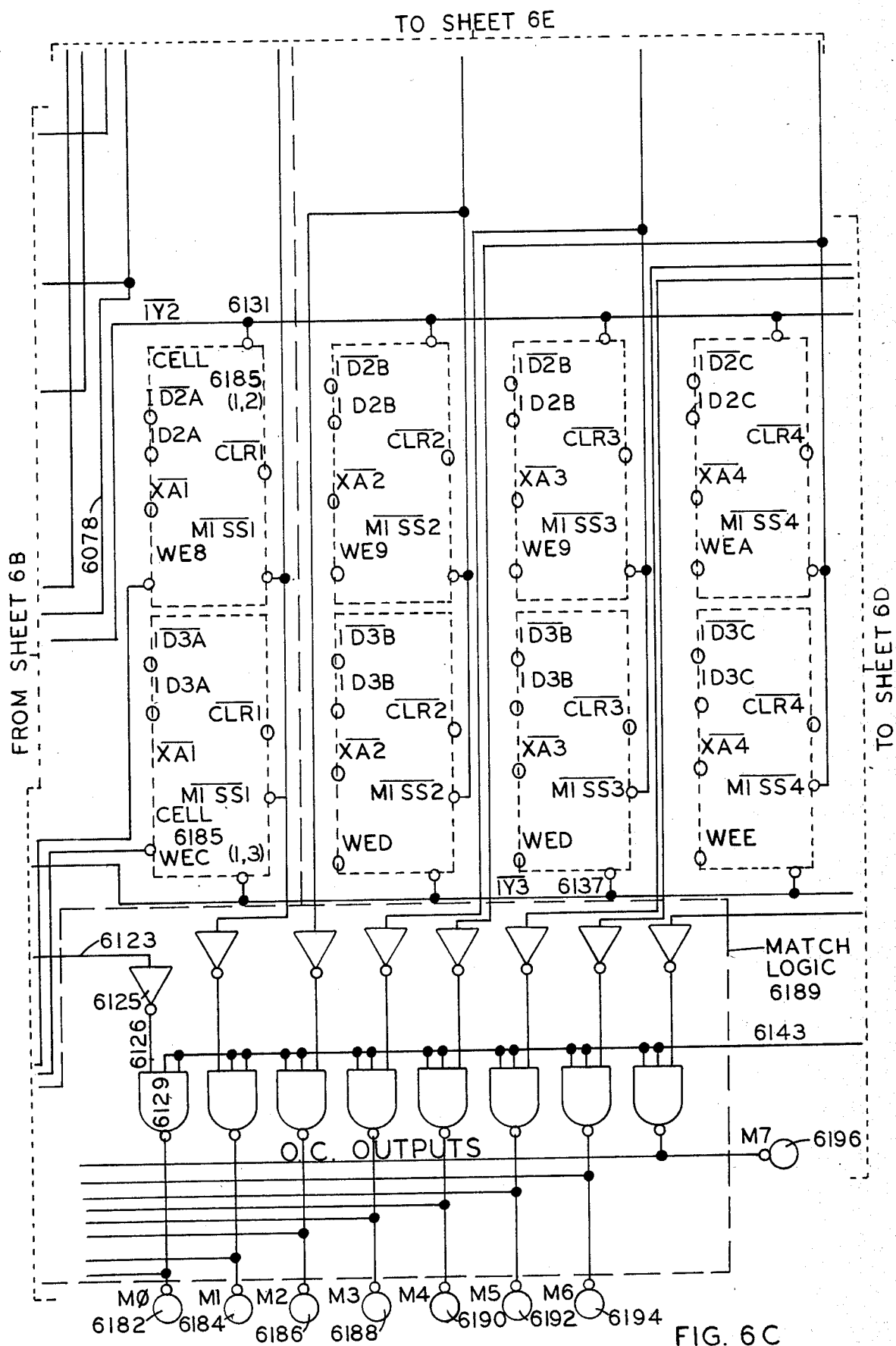
Figure 6D:
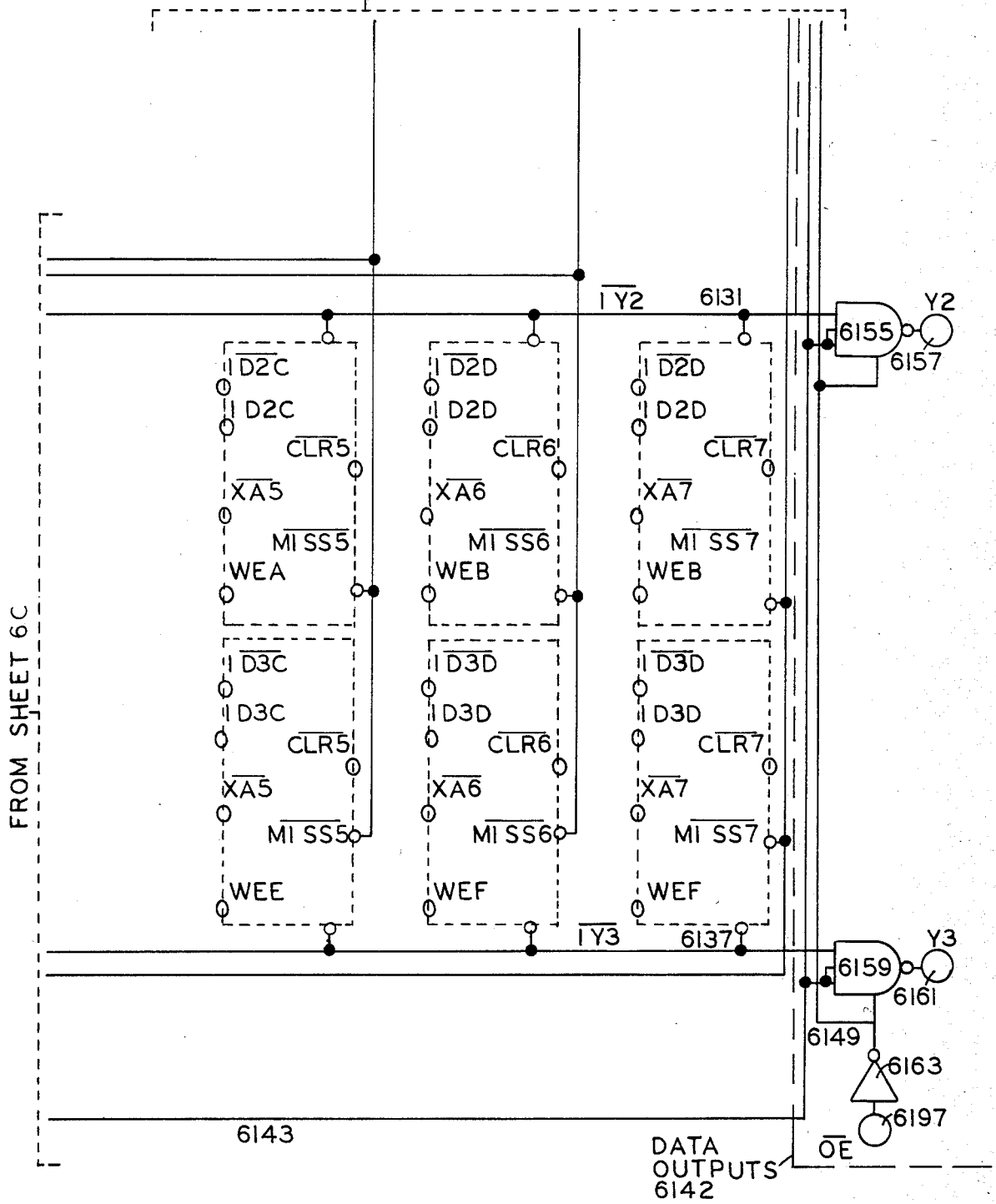

CAMM 101 represented in FIGS. 6 and 6A through 6F, has the following inputs: on FIG. 6, data input lines D0 6167, D1 6171, D2 6175, and D3 6179, corresponding to data input lines 117 of FIG. 1; mask lines E0 6169, E1 6173, E2 6177, and E3 6181, corresponding to mask lines 127 and serving to mask the corresponding data input line when they are active; on FIG. 6A, external address lines A0 6026, A1 6028, and A2 6030, corresponding to external address lines 113; on FIG. 6D, $\overline{OE}$ line 6197, corresponding to OE 131; and on FIG. 6A, write enable line $\overline{WE}$ 6068, corresponding to WE 133, and $\overline{CLR}$ line 6081, corresponding to CLR 135. Lines $\overline{WE}$ 6068, $\overline{OE}$ 6197, and $\overline{CLR}$ 6081 are all normally active and are inactivated to specify a write, read, or clear operation respectively. Outputs from CAMM 101 represented in FIG. 6 are data output lines Y0 6147, Y1 6153, Y2 6157, and Y3 6161, on FIGS. 6D and 6F corresponding to data output lines 119 and bidirectional external match lines M0 6182 through M7 6196 on FIG. 6C corresponding to external match lines 125 in FIG. 1. As specified on FIG. 6C, external match lines M0 6182 through M7 6196 are connected to open collector outputs. When one such external match line M0 6182 through M7 6196 is connected to external match lines from other CAMMs 101 of the type disclosed in FIG. 6, the result is a wire AND: none of the connected external match lines will be active unless all of them are.

4.5.2 Functional Subdivisions of the TTL Implementation

Figure 6E:
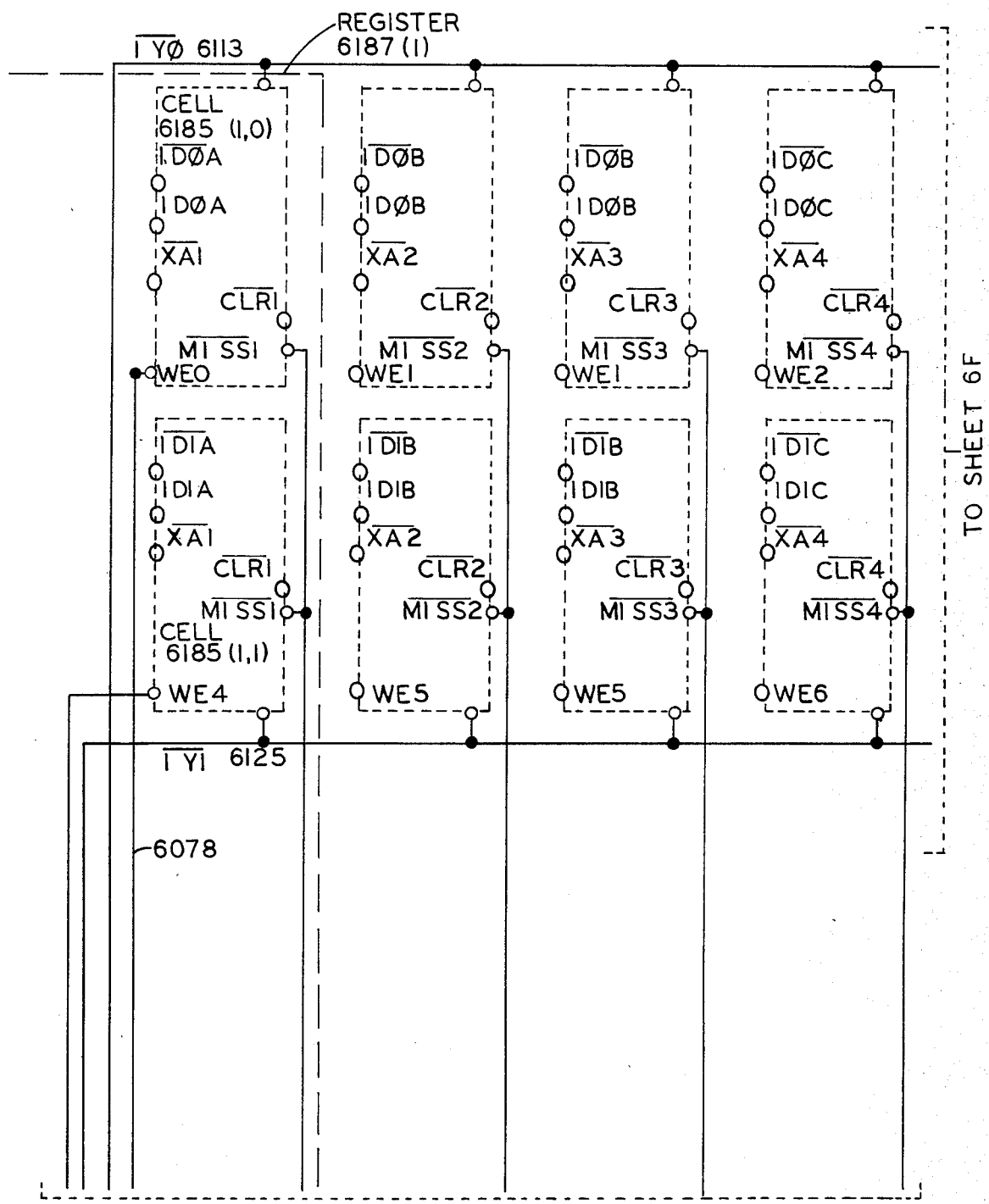

CAMM 101 of FIG. 6A has the following functional subdivisions, outlined in dashed lines: on FIG. 6, data and mask input 6183, for receiving inputs from data input lines D0 6167 through D3 6179 and mask lines E0 6169 through E3 6181; on FIG. 6A, address decoder 6067, corresponding to address decoder 109, for receiving external address lines A0 6026 through A2 6028 and decoding addresses received on these lines; on FIGS. 6D and 6E, data outputs 6142 for outputting data received from registers 6176; on FIG. 6B, clear logic 6090, corresponding to clear logic 111, for clearing individual registers 6176; and on FIG. 6B, match logic 6189, for detecting matches. In addition, one register, register (0) 6187, on FIG. 6B, is outlined with dashed lines, and one cell of register (0) 6187, cell (0,0) 6185, is so outlined. Registers 6187 correspond to registers 105 of FIG. 1, and cells 6185 correspond to cells 107. The discussion deals first with each of these functional divisions and then with their interaction in the read, write, match, and associative clear operations.

4.5.2.1 Data and Mask Inputs 6183

Data and mask inputs 6183 on FIG. 6 include data input lines D0 6167 through D3 6179, mask lines E0 6169 through E3 6181 paired with the data lines, and associated logic. Since each data input line-mask line pair has the same logic, only that for data input line D0 6167 and mask line E0 6169 is discussed in detail. Beginning with D0 6167, the logic includes inverter 6001, with D0 6167 as its input and line 6003 as its output; inverter 6005, with line 6003 as its input and line 6011 as its output; inverter 6007, with mask line E0 6169 as its input and line 6009 as its output; NAND gate 6013, with inputs from lines 6003 and 6009 and an output to line 6017; inverters 6023, having line 6017 as their input and lines to cells 6185 as their outputs; NAND gate 6015, with inputs from lines 6009 and 6011 and an output to line 6019, and inverters 6020, with inputs from line 6019 and lines to cells 6185 as their outputs. In the following, only $\overline{ID0A}$ line 6025, the output of inverter 6021, and ID0A line 6024, the output of inverter 6022, are discussed in detail.

In the portion of data and mask inputs 6183 associated with data input line D0 6167 and mask line E0 6169, the inputs D0 6167 and E0 6169 and the outputs ID0A 6024 and $\overline{ID0A}$ 6025 have the following relationships: if data input line D0 6167 is not being masked, that is, if mask line E0 6169 is inactive, ID0A line 6024 is set to the value of data input line D0 6167 and $\overline{ID0A}$ line 6025 is set to the complement of that value; if data input line D0 6167 is being masked, that is, if E0 6169 is active, ID0A line 6024 and $\overline{ID0A}$ line 6025 are both inactive These relationships are achieved as follows: beginning with the case in which no masking is taking place, when mask line E0 6169 is inactive, line 6009 is active and the values of the outputs of NAND gates 6013 and 6015 depend on the values of lines 6003 and 6011 respectively. The values of lines 6003 and 6011 in turn depend on the value of data input line D0 6167. If data input line D0 6167 is active, line 6003 is inactive and line 6011 is active. Consequently, line 6019, the output of NAND gate 6015, is inactive, and its inversion, ID0A line 6024, is active, while line 6017, the output of NAND gate 6013, is active, and its inversion, $\overline{ID0A}$ line 6025, is inactive. If data input line D0 6167 is inactive, the reverse of the above is true. Thus, when mask line E0 6169 is inactive, ID0A line 6024's value is always identical with that of data input line D0 6167 and $\overline{ID0A}$ line 6025's value is always the complement of the value of data input line D0 6167. When data input line D0 6167 is being masked on the other hand, mask line E0 6169 is active, line 6009 is inactive, and consequently, NAND gates 6013 and 6015 have active outputs 6017 and 6019 and ID0A line 6024 and $\overline{ID0A}$ line 6025 are inactive regardless of the value of data input line D0 6167.

4.5.2.2 Address Decoder 6067—FIGS. 6A and 7

Turning now to address decoder 6067, on FIG. 6A, address decoder 6067's inputs are external address lines A0 6026, A1 6028, and A2 6030 and its outputs are internal address lines 6065, corresponding to internal address lines 115. Each line in internal address lines 6065 is associated with a register 6187. Lines in internal address lines 6065 are active unless register 6187 associated with a line is being addressed; in that case, the line associated with register 6187 being addressed is inactive. Thus, address decoder 6066 operates by activating all internal address lines 6065 but the one for the register specified by external address lines A0 6026 through A2 6030.

Address decoder 6066 consists of inverters 6027 through 6043 and NAND gates 6051 through 6054. Each address line A0 6026 through A2 6030 is input to an inverter and the output from that inverter is input to another inverter. Thus, for each address line A0 6026 through A2 6030, there is available from the first inverter a signal which is the complement of the signal on the corresponding external address line and from the second inverter a signal which is identical with that on the corresponding external address line. The signals obtained from the inverter outputs are then input to NAND gates 6051 through 6054. Each of these gates takes three inputs, one derived from address line A0 6026, one from address line A1 6028, and one from address line A2 6030. An input derived from a given address line is obtained from the output of either the first or second inverter following the address line. The input's value is therefore either identical with the value of the address line or the complement of that value. For example, NAND gate 6063 takes as its inputs line 6033, line 6035, and line 6049. Line 6033's value is the complement of the value of external address line A0 6026, line 6035's value is the complement of the value of external address line A1 6028, and line 6049's value is identical with that of external address line A2 6030. The inputs to NAND gates 6051 through 6064 are distributed among the gates in such fashion that a given combination of signals on external address lines A0 6026 through A2 6030 causes one of NAND gates 6051 through 6064 to have an inactive output and the remainder to have active outputs. For instance, NAND gate 6064 takes as its inputs line 6037, whose value is the complement of the value on external address line A2 6030, line 6035, whose value is the complement of the value on external address line A1 6028, and line 6033, whose value is the complement of the value on external address line 6026. NAND gate 6064's output 6067 is active unless line 6037, line 6035, and line 6028 are all simultaneously active, and the latter is true only if external address lines A0 6026 through A2 6030 are simultaneously inactive, that is, only if the values on external address lines A0 6026 through A2 6030 represent a binary 0. With all other NAND gates 6051 through 6063, when external address lines A0 6026 through A2 6030 are simultaneously inactive, at least one input line to each of NAND gates 6051 through 6063 is inactive, and consequently, all NAND gates 6051 through 6063 have active outputs.

The complete relationship between combinations of signals on external address lines A0 6026 through A2 6030 and outputs on internal address lines 6065 is illustrated in the truth table in FIG. 7. In that table, the table rows indicate the eight possible combinations of values on address lines A0 6026 through A2 6030 and the table columns indicate individual NAND gates 6051 through 6054 and their input lines. The table entries themselves show the output of the NAND gate specified by the entry's column for the values on address lines A0 6026 through A2 6030 specified by the entry's row.

4.5.2.3 Cell 6185 (0,0)

Turning now to cell 6185 (0,0), on FIG. 6B, cell 6185 (0,0) has the following inputs: data line ID0A 6024 and data complement line $\overline{\text{ID0A}}$ 6025 from data and mask inputs 6183, internal address line $\overline{\text{XA0}}$ 6067, from NAND gate 6064 of address decoder 6066, internal write enable line WE0 6078, whose value is derived from external write enable line WE 6068 by way of inverters 6069, 6071, and 6073 on FIG. 6A, and is therefore the complement of the value of external write enable line $\overline{\text{WE}}$ 6068, and internal clear line $\overline{\text{CLR0}}$ 6089, which corresponds to internal clear lines 123 except that internal clear line $\overline{\text{CLR0}}$ 6089 is inactive when an associative clear operation is taking place. Outputs from cell 6185 (0,0) are cell data line $\overline{\text{IY0}}$ 6113, whose value is the complement of the value stored in cell 6185 (0,0), and cell match lines 6117 and 6121, which are both active when either data input line D0 6167 is masked or the value contained in cell 6185 (0,0) matches the value on data input line D0 6167.

Cell 6185 (0,0) consists of: inverter 6091, receiving its input from internal address line $\overline{\text{XA0}}$ 6067; NAND gate 6095, receiving its inputs from inverter 6091, WE0 line 6078, and data line ID0A 6024; NAND gate 6097, receiving its inputs from inverter 6091, WE0 line 6078, and data complement line $\overline{\text{ID0A}}$ 6025; NAND gate 6103, receiving its inputs from NAND gate 6095 and NAND gate 6107; NAND gate 6107, receiving its inputs from NAND gate 6103, NAND gate 6097, and internal clear line $\overline{\text{CLR0}}$ 6089; NAND gate 6111, receiving its inputs from NAND gate 6105 and inverter 6091; NAND gate 6115, receiving its inputs from data line ID0A 6024 and NAND gate 6107, and NAND gate 6119, receiving its inputs from NAND gate 6103 and data complement line $\overline{\text{ID0A}}$ 6025. Finally, connection point 6122, connecting the outputs of NAND gates 6115 and 6119, is a wire AND; consequently, if either or both of lines 6117 and 6119 is inactive, line 6123 is inactive.

The components of cell 6185 (0,0) perform the same logical functions as the components of cell 565 (i,0) in FIG. 5. NAND gates 6095 and 6097 take inputs which are equivalent to those for AND gates 515 and 517 in FIG. 5 and provide outputs which are the complements of those of AND gates 515 and 517. Line 6099, the output of NAND gate 6095, is active unless line 6093, line ID0A 6024, and line WE0 6078 are all active. Line 6093 is the complement of internal address line $\overline{\text{X0A}}$ 6067, and consequently, is active only when register 6187 is being addressed, while line WE0 6078 is active only when a write operation is taking place. Therefore, line 6099 is inactive only when a write operation to register 6187 (0) is taking place and line ID0A 6024 is active. During a write operation to register 6187 (0), line 6099's value is thus the complement of the value of line ID0A 6024. NAND gate 6097's inputs are line 6093, line WE0 6078, and line $\overline{\text{ID0A}}$ 6025, and like NAND gate 6097, its output 6101 is inactive only when a write operation to register 6187 (0) is taking place and line $\overline{\text{ID0A}}$ 6025 is active. During a write operation, therefore, Line 6101's value is the complement of the value of line $\overline{\text{ID0A}}$ 6025 and also the complement of the value of line 6099. At other times, both line 6101 and line 6099 are active.

NAND gates 6103 and 6107 function as an RS flip-flop with R and S inputs which change the flip-flop's state when they become inactive. NAND gates 6103 and 6107 and NAND gates 6095 and 6097 together thus are logically equivalent to AND gates 515 and 517 and RS flip-flop 529 in FIG. 5. In the RS flip-flop formed by NAND gates 6103 and 6107, line 6105, the output of NAND gate 6103, is the Y output and line 6109, the output of NAND gate 6107 is the $\overline{\text{Y}}$ output. The set operation works as follows: line 6099 is the S input. As the output of NAND gate 6095, it is inactive only when input data line ID0A 6024, write enable line WE0 6078, and line 6093, the complement of internal address line $\overline{\text{XA0}}$ 6067, are active. When line 6099 is inactive, line 6105 becomes active, i.e., the Y output is set to 1. At the same time, line 6109 becomes inactive, i.e., the $\overline{\text{Y}}$ output is set to 0. This action takes place as follows: line 6105, line 6101 and $\overline{\text{CLR0}}$ line 6089 are inputs to NAND gate 6107. On a write operation, $\overline{\text{CLR0}}$ line 6089 is active. If line ID0A 6024 is active, lines 6105 and 6101 are also active; consequently, line 6109, the $\overline{\text{Y}}$ output, is inactive. If, on the other hand, line ID0A 6024 is inactive, line 6099 is active, lines 6105 and 6101 are inactive, and line 6109 is active. Thus, in this case, the Y output has the value 0 and the $\overline{\text{Y}}$ output the value 1.

$\overline{\text{CLR}}$ line 6089 acts as the R input to the flip-flop formed by NAND gates 6103 and 6107 only when no write operation is taking place. Under these circumstances, write enable line WE0 6078 is inactive, and consequently, lines 6099 and 6101 are active. When the flip-flop formed by NAND gates 6103 and 6107 contains the value 0, line 6105 is inactive and line 6109 is active regardless of the value of $\overline{\text{CLR}}$ line 6089. When the flip-flop formed by NAND gates 6103 and 6107 contains the value 1, line 6105 is active along with line 6101 and the value of $\overline{\text{CLR}}$ line 6089 determines the value of lines 6109 and 6105. If $\overline{\text{CLR}}$ line 6089 remains active, line 6109 remains inactive and line 6105 remains active; if $\overline{\text{CLR}}$ line 6089 becomes inactive, line 6109 becomes active and line 6105 becomes inactive, giving the flip-flop's Y output the value 0 and its $\overline{\text{Y}}$ output the value 1. Since either line 6101 or 6089 can reset the flip-flop formed by NAND gates 6103 and 6107, the connection of these lines to NAND gate 6107 is functionally equivalent to OR gate 525 in FIG. 5.

NAND gate 6111 in FIG. 6A inactivates cell data line $\overline{\text{IY0}}$ 6113 when both line 6093 and line 6105 are active. Line 6093 is the complement of internal address line $\overline{\text{XA0}}$ 6067, and is therefore active when register 6187 (0,0) is being addressed. Line 6105 is the Y output of the flip-flop formed by NAND gates 6103 and 6107, and consequently, when register 6187 (0,0) is being addressed, cell data line line $\overline{\text{IY0}}$ 6113's value is the complement of the value on line 6105. As shown on FIGS. 6E and 6F, cell data line $\overline{\text{IY0}}$ 6113 receives outputs from equivalent cells of all registers in the CAMM 101 described in FIG. 6 and then serves as an input to tri-state NAND gate 6145 on FIG. 6F. It thus effectively ORs these outputs and is equivalent to OR gate 569 in FIG. 5. Tri-state NAND gate 6145's output is data output line Y0 6147. This line has three states, active, inactive, and off. It is in the latter state when $\overline{\text{OE}}$ line 6197 is inactive and its complement, line 6149, is active; otherwise, input line 6143 is at VCC and is always active, and consequently, data output line Y0 6147's value is the complement of the value of cell data line $\overline{\text{IY0}}$ 6113, or the value of the Y output of the flip-flop formed by NAND gates 6103 and 6107. Together, NAND gates 6145 and 6111 output the value of the Y output of cell 6185 (0,0) when register 6187 (0) is addressed and output has been enabled; NAND gates 6145 and 6111 are thus logically equivalent to AND gates 535 and 571 of FIG. 5.

Turning again to FIG. 6B, NAND gates 6115, 6119, and the wire AND formed by connection 6122 between the outputs of NAND gates 6115, 6119, and internal match line 6123, finally, perform the match function for cell 6185 (0,0) and are thus equivalent to AND gates 533 and 534 and OR gate 540 in FIG. 5. NAND gate 6115 takes as its inputs line ID0A 6024 and line 6109 from the Y output of the flip-flop formed by NAND gates 6103 and 6107. NAND gate 6119 takes as its inputs line $\overline{\text{ID0A}}$ 6025 and line 6105 from the Y output of the flip-flop. If mask line E0 6169 is inactive, then, as described in the discussion of data and mask inputs 6183 above, the values on line ID0A 6024 and line $\overline{\text{ID0A}}$ 6025 are complementary. As also explained above, the values on lines 6105 and 6109 are always complementary. Consequently, when the value on line ID0A 6024 is the same as the value on line 6105, NAND gates 6115 and 6119 have complementary inputs and their outputs, lines 6117 and 6121, are both active. When the value on line ID0A is different from that on line 6105, one of NAND gates 6115 and 6119 has both inputs high, and lines 6117 and 6121 have complementary values. When lines 6117 and 6121 are both active, the output from the AND formed by connection 6122 is active, indicating a match. When lines 6117 and 6121 have complementary values, the output from the AND formed by connection 6122 is inactive, indicating no match. Thus, when mask line E0 6169 is inactive, the output from the AND formed by connection 6122 is equivalent to the output of OR gate 540 when mask line e(0) 507 is inactive.

As mentioned in the discussion of data and mask inputs 6183, when mask line E0 6169 is active, both line ID0A 6024 and line $\overline{\text{ID0A}}$ 6025 are inactive. Since line ID0A 6024 serves as an input to NAND gate 6115, and line $\overline{\text{ID0A}}$ as an input to NAND gate 6119, the outputs of the NAND gates, lines 6117 and 6121 respectively, are both active regardless of the values on lines 6105 and 6109 and the output from the AND formed by connection 6122 is active, indicating a match. Thus, data and mask inputs 6183, NAND gates 6115 and 6119 and the AND formed by connection 6122 produce the same results when mask line E0 6169 is active as OR gate 540 in FIG. 5.

4.5.2.4 Register 6187 (0)

Cell 6185(0,0) and three equivalent cells 6185 form register 6187(0). All cells 6185 in register 6187 (0) take internal address line $\overline{\text{XA0}}$ 6067, and internal clear line $\overline{\text{CLR0}}$ 6089 as inputs and output to internal match line 6123. Because the cells in register 6187 share internal address line $\overline{\text{XA0}}$ 6067, internal clear line $\overline{\text{CLR0}}$ 6089, and internal match line 6123, they act as a single unit in read, write, match, and associative clear operations.

4.5.2.5 Data Outputs 6142

Figure 6F:
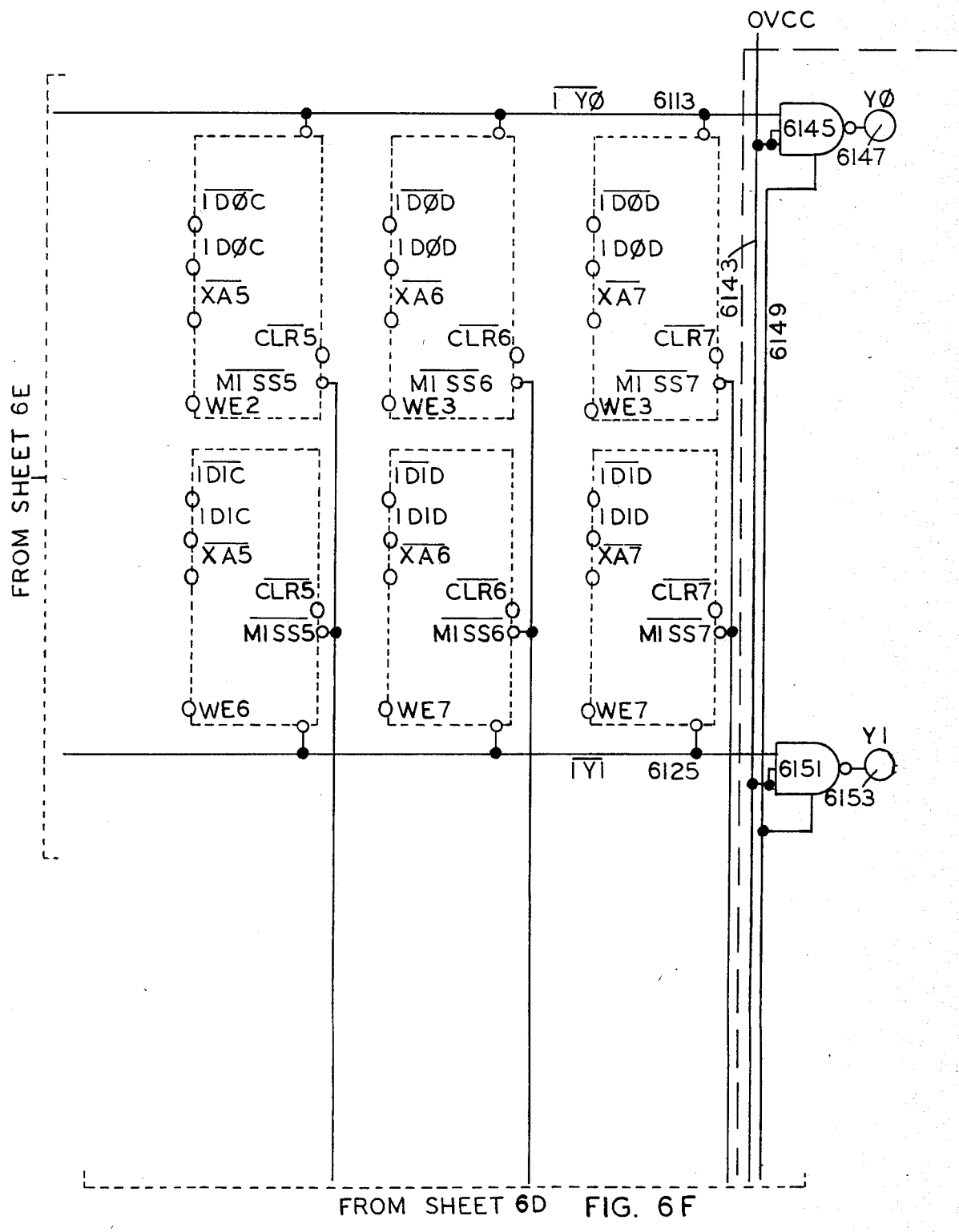

Data outputs 6142, on FIGS. 6D and 6F, outputs data contained in CAMM 101 registers 6187 to data output lines Y0 6147 through Y3 6161. Data to be output is received from lines $\overline{\text{IY0}}$ 6113, $\overline{\text{IY1}}$ 6125, $\overline{\text{IY2}}$ 6131, and $\overline{\text{IY3}}$ 6137. As previously explained, when a read operation is being performed, the values on these lines are the complements of the values in cells 6185 (i,0) through (i,3) of register 6187 (i) currently being addressed. Each of these lines is one input to one of NAND gates 6145 through 6159. NAND gates 6145 through 6159 are tri-state, that is, their outputs have three states, active, inactive, and off. The off state is controlled by $\overline{\text{OE}}$ line 6197. When $\overline{\text{OE}}$ line 6197 is active, line 6149 is inactive, and NAND gates 6145 through 6159 have no output; otherwise, their outputs are the NAND of their inputs. The other input to each of NAND gates 6155 through 6159 is line 6143, which is always active. Consequently, when $\overline{\text{OE}}$ line 6197 is inactive, the outputs of NAND gates 6145 through 6159 are the complements of the values on lines 6113, 6125, 6131, and 6137, that is, identical with the values contained in cells 6185 (i,0) through (i,3) in register 6187 (i).

4.5.2.6 Match Logic 6189

Match logic 6189 for register 6187 (0), on FIG. 6C, consists of internal match line 6123, inverter 6125, NAND gate 6129, and external match line M0 6182. The match logic for the other registers 6187 is identical, and consequently, only that for register 6187(0) is explained in detail.

Internal match line 6123 connects the output of wire AND 6122 with the outputs of equivalent wire ANDs in the other cells 6185 of register 6187 (0) and thereby forms another wire AND taking the output of wire AND 6122 and the outputs of its equivalents as inputs. Thus, internal match line 6123 is active only if the outputs of wire AND 6122 and its equivalents are all active, that is, only if each cell 6185 in register 6187 (0) indicates a match. Internal match line 6123 thus performs the function of AND gate 553 of FIG. 5.

Internal match line 6123 then serves as an input to inverter 6125, whose output, line 6126, is an input to NAND gate 6129. The other input to NAND gate 6129, line 6143, is at Vcc and therefore always active. In consequence, NAND gate 6129's output is inactive unless line 6126 is inactive, that is, unless internal match line 6123 is active. As indicated on FIG. 6A, external match line M0 6182 is an open collector output; hence, it acts as the output of a wire AND connecting the outputs of the equivalents of NAND gate 6129 in all CAMM registers 6187 whose equivalents to external match line M0 6182 are connected to external match line M0 6182, and if any of these external match lines are inactive, external match line M0 6182 is inactive.

4.5.2.7 Clear Logic 6090

Clear logic 6090 on FIGS. 6A and 6B activates internal clear line $\overline{\text{CLR0}}$ 6089 and its equivalents in other registers 6187. Inputs to clear logic 6090 are $\overline{\text{CLR}}$ line 6081, which is active except when an associative clear operation is being performed, and external match lines M0 6182 through M7 6196. Clear logic 6090 includes inverter 6083 and inverters 6084. Inverters in inverters 6084 are all identical to inverter 6088, and consequently, only that inverter is described in detail. Inverter 6088 has a control input, entering at the side of inverter 6088, as well as an input for the signal being inverted. As long as the control input is inactive, inverter 6088's output is active; when the control input is active, inverter 6088's output is the complement of the value of the signal being inverted. Inverter 6088 thus behaves like a NAND gate in that inverter 6088's output is inactive only if the control input and the input signal are both active. The control input for inverter 6088 is line 6095, which is the output of inverter 6083 and the signal input is external match line M0 6182. Line 6095's value is thus the complement of the value of $\overline{\text{CLR}}$ line 6081, and internal clear line $\overline{CLR0}$ 6089 is inactive, clearing register 6187(0), only if $\overline{CLR}$ line 6081 is inactive when external match line M0 6182 is active. Taken together, therefore, inverter 6083 and inverter 6088 are equivalent to AND gate 514 of FIG. 5.

4.5.3 Operations in the TTL Gate Array Implementation

Operations in the TTL gate array implementation are analogous to those discussed in reference to FIG. 5. On a write operation to register 6187 (0), on FIG. 6B, $\overline{WE}$ line 6068 is inactive and address lines A0 6026 through A3 6030 specify register 6187(0). Consequently, in each cell 6185 of the register, WE0 line 6078 is active, internal address line $\overline{XA0}$ 6097 is inactive, the line corresponding to line ID0A 6024 in cell 6185 (0,0) has the value of the line corresponding to data input line D0 6167, and the line corresponding to line $\overline{ID0A}$ 6025 has that value's complement. As explained in the discussion of cell 6185 (0,0), when WE0 line 6078 is active and internal address line $\overline{XA0}$ 6097 is inactive, the RS flip-flop contained in each cell 6185 is set to the value on the data input line of data input lines D0 6167 through D3 6179 corresponding to that cell 6185.

In a read operation on register 6187 (0), output enable line $\overline{OE}$ 6197 is inactivated and external address lines 6026 through 6030 specify register 6187 (0), deactivating internal address line $\overline{XA0}$ 6067. As explained in the discussion of cell 6185 (0,0), when internal address line $\overline{XA0}$ 6067 is inactive, line IY0 6113 and its equivalents in the other cells 6185 making up register 6187(0) have values which are the complement of the value at the Y output of cell 6185's flip-flop. The discussion of data outputs 6142 further showed that when output enable line $\overline{OE}$ 6197 is inactivated, the complements of the values of line 6113 and its equivalents in the other cells 6185 making up register 6187 (0) are output at data outputs Y0 6147 through Y(3) 6161. Since the values output at data outputs Y(0) 6147 through Y(3) 6161 are the complements of the values on line 6113 and its equivalents, they are identical with the values at the Y outputs of cells 6185 making up register 6187(0).

Turning now to a match operation, as previously explained with regard to cell 6185 (0,0), whenever a value on a data line D0 6167 through D3 6179 matches the value of its corresponding cell 6185 or whenever mask line E0 6169 through E3 6181 is active, the output of the connection in cell 6185 corresponding to connection 6122 in cell 6185 (0,0) is active. All of the connections corresponding to connection 6122 in cells 6185 belonging to a register 6187 (i) are connected by the line in register 6187 (i) corresponding to internal match line 6123 of register 6187 (0). As explained in the discussion of match logic 6189, internal match line 6123 and its equivalents function as wire ANDs taking the outputs from connection 6122 and its equivalents as inputs. The equivalent of internal match line 6123 for a register 6187 (i) is therefore active only if all outputs from connections equivalent to connection 6122 are active. If the equivalent of internal match line 6123 for a register 6187 (i) is active, then, as explained in the discussion of match logic 6189, external match line M0 6182 through M7 6196 corresponding to register 6187 (i) is active unless external match line M0 6182 through 6196 corresponding to register 6187 (i) is connected to external match lines M0 6182 through 6196 belonging to other CAMMs 101 and one of these external match lines M0 6182 through 6196 is inactive.

An associative clear operation, finally, is executed for a register 6187 (i) when external match line M0 6182 through M7 6196 corresponding to register 6187 (i) is active and $\overline{CLR}$ line 6081 is inactivated. As explained in the discussion of clear logic 6090, under these circumstances, the equivalent of line $\overline{CLR0}$ 6089 is inactive, and as explained in the discussion of cell 6185 (0,0), when this is the case, all cells 6185 belonging to register 6187 (i) are simultaneously set to 0.

Embodiments of the present invention may have specific forms other than those presented in FIGS. 1 through 7. The functions of the present invention may be performed by arrangements of logical devices other than those presented herein and different techniques may be used to implement the present invention. For example, the present invention may be implemented using discrete devices, on a chip containing a single CAMM 101, or on a chip containing a plurality of CAMMs 201, and the devices on the chips may be formed using various technologies. Similarly, the number of bits in a register and the number of registers in a CAMM 101 may vary from implementation to implementation.

The invention may be embodied in yet other specific forms without departing from the spirit or essential characteristics thereof. Thus, the present embodiments are to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A content-addressable memory module comprising:
   (1) a plurality of register means, each register means of said plurality of register means containing one stored item of data;
   (2) means for receiving a pattern item of data;
   (3) a plurality of means for detecting said register means containing said stored items of data matching said pattern item of data, each one of said plurality of match detection means being associated with one said register means, being responsive to said stored item of data contained in said one said register means and to said pattern item of data, and providing a match signal when said one said register means associated with said one match detection means contains said stored item of data matching said pattern item of data; and
   (4) a plurality of bidirectional match signalling means for providing said match signal from said content-addressable memory module and receiving said match signal from an external source, each one of said bidirectional match signalling means being associated with one of said register means and responsive to said match signal from said match detection means associated with said associated register means and to said match signal from said external source, and acting to provide said match signal only when simultaneously receiving said match signal from said associated match detection means and from said external source.

2. In the content-addressable memory module of claim 1, and wherein
said bidirectional match signalling means is a match line connected to said associated match detection means for providing and receiving a match state and a no-match state;
said match signal is said match state; and said match line is connected to an open-collector driver circuit in said associated match detection means and said open-collector driver circuit places said connected match line in said no match state unless said stored item of data in said register means associated with said match detection means matches said pattern item of data.

3. In the content-addressable memory module of claim 2, and wherein:
said match state is a high voltage and
said no match state is a low voltage.

4. In the content-addressable memory module of claim 3, and wherein:
a pattern sequence of bits in said pattern item of data corresponds to a certain sequence of bits in each one of said stored items of data, said match detection means is responsive to said pattern sequence of bits and to said certain sequence of bits, and said stored item of data matches said pattern item of data when said bits in said certain sequence match said bits in said pattern sequence.

5. In the content-addressable memory module of claim 4, and wherein:
said content-addressable memory module further includes means for receiving a masking item of data for specifying said pattern sequence of bits and
said match detection means is further connected to said masking item receiving means and is responsive to said masking item of data.

6. In the content-addressable memory module of claim 5, and wherein:
said masking item of data further specifies a non-pattern sequence of bits in said pattern item of data;
said stored items of data further contain a second certain sequence of bits corresponding to said non-pattern sequence of bits; and
one said stored item of data matches said pattern item of data when said first certain sequence of bits matches said pattern sequence of bits, regardless of the values of bits in said second certain sequence of bits.

7. A content-addressable memory module comprising:
(1) a plurality of register means, each register means of said plurality of register means containing one stored item of data;
(2) means for receiving a pattern item of data;
(3) means for receiving a clear signal specifying that certain ones of said plurality of register means are to be cleared, said certain ones being said register means containing said stored items of data matching said pattern item of data; and
(4) means for simultaneously clearing said certain ones of said register means, said simultaneous clearing means being connected to said plurality of register means, to said pattern receiving means, and to said clear signal receiving means and responding to said stored item of data, said pattern item of data, and said clear signal by simultaneously clearing said certain ones of said register means on receipt of said clear signal in said clear signal receiving means;
wherein:
a pattern sequence of bits in said pattern item of data corresponds to a certain sequence of bits in each one of said stored items of data and said stored item of data matches said pattern item of data when said bits in said certain sequence match said bits in said pattern sequence;
and wherein said simultaneous clearing means includes:

(a) a plurality of means for detecting said register means containing said stored items of data matching said pattern item of data, each one of said plurality of match detection means being associated with one said register means and being responsive to said stored item of data contained in said one said register means and to said pattern item of data, and each one of said plurality of match detection means acting to provide a match signal when said one said register means associated with said one match detection means contains said stored item of data matching said pattern item of data;
(b) means for providing a register clearing signal specifying any one of said register means in response to said clear signal and to said match signal; and
(c) a plurality of means for clearing said register means, each one of said register clearing means being associated with one of said register means and being responsive to said register clearing signal.

8. In the content-addressable memory module of claim 7, and wherein:
said content-addressable memory module further includes a plurality of bidirectional match signalling means for providing said match signal from said content-addressable memory module, receiving said match signal from an external source, and providing said match signal to said register clearing signal providing means, each bidirectional match signalling means of said plurality of bidirectional match signalling means being associated with one register means of said plurality of register means and being connected to said match detection means associated with said associated register means and to said register clearing signal providing means, and each said bidirectional match signalling means providing said match signal to said register clearing signal providing means only when said bidirectional match signalling means is simultaneously receiving said match signal from said connected match detection means and from said external source.

9. In the content-addressable memory module of claim 8, and wherein:
said bidirectional match signalling means is a match line connected to said match detection means and to said register clearing signal providing means;
said match line provides and receives a match state and a no-match state;
said match signal is said match state; and
each said match line is connected to an open-collector driver circuit in said associated match detection means and said open-collector driver circuit places said connected match line in said no match state unless said stored item of data in said register means associated with said match detection means matches said pattern item of data.

10. A content-addressable memory module comprising:
(1) a plurality of register means, each register means of said plurality of register means containing one stored item of data;
(2) means for receiving a pattern item of data;
(3) means for receiving a clear signal specifying that certain ones of said plurality of register means are to be cleared, said certain ones being said register means containing said stored items of data matching said pattern item of data; and (4) means for simultaneously clearing said certain ones of said register means, said simultaneous clearing means being connected to said plurality of register means, to said pattern receiving means, and to said clear signal receiving means and responding to said stored item of data, said pattern item of data, and said clear signal by simultaneously clearing said certain ones of said register means on receipt of said clear signal in said clear signal receiving means;

wherein:
  a pattern sequence of bits in said pattern item of data corresponds to a certain sequence of bits in each one of said stored items of data and said stored item of data matches said pattern item of data when said bits in said certain sequence match said bits in said pattern sequence.

and wherein:
  said content-addressable memory further includes means for receiving a masking item of data for specifying said pattern sequence of bits and said simultaneous clearing means is further connected to said masking item receiving means and is responsive to said masking item of data;

and wherein:
  said masking item of data further specifies a non-pattern sequence of bits in said pattern data item;
  said stored items of data further contain a second certain sequence of bits corresponding to said non-pattern sequence of bits; and
  one said said stored item of data matches said pattern data item when said first certain sequence of bits matches said pattern sequence of bits, regardless of the values of bits in said second certain sequence of bits;

and wherein:
  said masking item of data specifies all said bits in said pattern item of data as said non-pattern sequence of bits, whereby all said stored items of data match said pattern item of data, all said register means in said plurality of register means are said certain ones of said plurality of register means, and said simultaneous clearing means simultaneously clears all said register means in said plurality of register means upon receipt of said clear signal in said clear signal receiving means.

11. In the content-addressable memory module of claim 10, and wherein:
said simultaneous clearing means further includes
  (a) a plurality of means for detecting said register means containing said stored items of data matching said pattern item of data, each one of said plurality of match detection means being associated with one said register means, being responsive to said stored item of data contained in said one said register means, to said pattern item of data, and to said mask item of data, and providing a match signal when said one said register means associated with said one match detection means contains said stored item of data matching said pattern item of data,
  (b) means for providing a register clearing signal to any one of said register means in response to said clear signal and to said match signal,
  (c) a plurality of means for clearing said register means, each one of said register clearing means being associated with one of said register means and being responsive to said register clearing signal.

12. In the content-addressable memory module of claim 11, and wherein:
said content-addressable memory module further includes a plurality of bidirectional match signalling means for providing said match signal from said content-addressable memory module, receiving said match signal from an external source, and providing said match signal to said register clearing signal providing means, each bidirectional match signalling means of said plurality of bidirectional match signalling means being associated with one register means of said plurality of register means and being connected to said match detection means associated with said associated register means and to said register clearing signal providing means, and each said bidirectional match signalling means providing said match signal to said register clearing signal providing means only when said bidirectional match signalling means is simultaneously receiving said match signal from said connected match detection means and from said external source.

13. In the content-addressable memory of claim 7, 10, or 1, and wherein said content-addressable memory module further comprises:
address receiving means connected to said plurality of register means for receiving an encoded address specifying an addressed register means of said plurality of register means from an external source, decoding said encoded address to generate an address signal for said addressed register means specified by said encoded address, and providing said address signal to said addressed register means, each register means of said plurality of register means being responsive to said address signal.

14. In the content-addressable memory module of claim 13 and wherein:
said address receiving means includes
  (a) encoded address receiving means for receiving an encoded address specifying said addressed register means from said external source;
  (b) decoding means connected to said encoded address receiving means and responsive to said encoded address for decoding said encoded address and generating said address signal for said addressed register means; and
  (c) means connected to said decoding means and said plurality of register means for providing said address signal to said addressed register means.

15. In the content-addressable memory module of claim 7, 10, or 1, and wherein said content-addressable memory module further comprises:
data input means for receiving an input item of data from an external source;
means for receiving an address specifying an addressed register means of said plurality of register means from an external source and providing an address signal for said addressed register means;
data output means for outputting one said stored item of data from said content-addressable memory module;
means for receiving an output enable signal from an external source;
means for receiving a write enable signal from an external source;
data writing means connected to said plurality of register means, said address receiving means, said data input means, and said write enable signal receiving means for setting said stored item of data in said addressed register means to the value of said input data item in response to said input item of data, said address signal, and said write enable signal;

data reading means connected to said plurality of register means, said address receiving means, said data output means, and said output enable signal receiving means for providing said stored item of data in said addressed register means to said data output means in response to said address signal and said output enable signal.

16. A content-addressable memory comprising:
(1) a plurality of content-addressable memory modules, each content-addressable memory module of said plurality of content-addressable memory modules including
   (a) a plurality of register means, each register means of said plurality of register means containing one stored item of data;
   (b) means for receiving a pattern item of data;
   (c) means for receiving a clear signal specifying that certain ones of said plurality of register means are to be cleared, said certain ones being said register means containing said stored items of data matching said pattern item of data; and
   (d) means for simultaneously clearing said certain ones of said register means, said simultaneous clearing means being connected to said plurality of register means, to said pattern item receiving means, and to said clear signal receiving means and responding to said stored item of data, said pattern item of data, and said clear signal by simultaneously clearing said certain ones of said register means on receipt of said clear signal in said clear signal receiving means; and
(2) memory clear signal providing means connected to said clear signal receiving means in each one of said plurality of memory modules for simultaneously providing said clear signal to all said content-addressable memory modules in said plurality of content-addressable memory modules;

wherein:

said simultaneous clearing means includes
   (i) a plurality of means for detecting said register means containing said stored items of data matching said pattern item of data, each one of said plurality of match detection means being associated with one said register means and being responsive to said stored item of data contained in said one said register means and to said pattern item of data, and each one of said plurality of match detection means acting to provide a match signal when said one said register means associated with said one match detection means contains said stored item of data matching said pattern item of data;
   (ii) means for providing a register clearing signal to any one of said register means in response to said clear signal and to said match signal; and
   (iii) a plurality of means for clearing said register means, each one of said register clearing means being associated with one of said register means and being responsive to said register clearing signal;

said content-addressable memory module further includes a plurality of bidirectional match signalling means for providing said match signal from said content-addressable memory module, receiving said match signal from an external source, and providing said match signal to said register clearing signal providing means, each bidirectional match signalling means of said plurality of bidirectional match signalling means being associated with one register means of said plurality of register means and being connected to said match detection means associated with said associated register means and to said register clearing signal providing means, and each said bidirectional match signalling means providing said match signal to said register clearing signal providing means only when said bidirectional match signalling means in simultaneously receiving said match signal from said connected match detection means and from said external source; and said content-addressable memory further includes a plurality of memory match signalling means for receiving said match signal from said bidirectional match signalling means and serving as said external source for providing said match signal to said bidirectional match signalling means, each one of said memory match signalling means corresponding to one of said bidirectional match signalling means, being connected to said corresponding said match signalling means in each of said content-addressable memory modules, and providing said match signal to said connected bidirectional match signalling means only when all of said connected bidirectional match signalling means are providing said match signal;

whereby said content-addressable memory responds to said clear signal provided by said memory clear signal providing means by clearing said register means only when said register means contain said stored items of data matching said pattern item of data and said register means are associated with said bidirectional match signalling means which are receiving said match signal from said memory match signalling means.

17. In the content-addressable memory of claim 16, and wherein said content-addressable memory further comprises:

an additional plurality of said content-addressable memory modules; and an additional said memory clear signal providing means connected to said clear signal receiving means in each one of said additional plurality of memory modules, and wherein each one of said plurality of memory match signalling means is further connected to said corresponding bidirectional match signalling means in each content-addressable memory module of said additional plurality of content-addressable memory modules.

18. In the content-addressable memory of claim 16, and wherein said content-addressable memory further comprises:

an additional plurality of said content-addressable memory modules; and an additional plurality of memory match signalling means, each one of said additional plurality of memory match signalling means being connected to said corresponding said match signalling means in each of said content-addressable memory modules of said additional plurality of content-addressable memory modules; and wherein said memory clear signal providing means is further connected to said clear signal receiving means in each content-addressable memory module of said additional plurality of memory modules.

19. In the content-addressable memory of claim 16, and wherein:

a pattern sequence of bits in said pattern item of data corresponds to a certain sequence of bits in each one of said stored items of data and said stored item of data matches said pattern item of data when said bits in said certain sequence match said bits in said pattern sequence.

20. In the content-addressable memory of claim 19, and wherein:
said simultaneous clearing means includes
  (i) a plurality of means for detecting said register means containing said stored items of data matching said pattern item of data, each one of said plurality of match detection means being associated with one said register means and being responsive to said stored item of data contained in said one said register means and to said pattern sequence of bits, and each one of said plurality of match detection means acting to provide a match signal when said one said register means associated with said one match detection means contains said stored item of data matching said pattern item of data,
  (ii) means for providing a register clearing signal to any one of said register means in response to said clear signal and to said match signal, and
  (iii) a plurality of means for clearing said register means, each one of said register clearing means being associated with one of said register means and being responsive to said register clearing signal;
said content-addressable memory module further includes a plurality of bidirectional match signalling means for providing said match signal from said content-addressable memory module, receiving said match signal from an external source, and providing said match signal to said register clearing signal providing means, each bidirectional match signalling means of said plurality of bidirectional match signalling means being associated with one register means of said plurality of register means and being connected to said match detection means associated with said associated register means and to said register clearing signal providing means, and each said bidirectional match signalling means providing said match signal to said register clearing signal providing means only when said bidirectional match signalling means is simultaneously receiving said match signal from said connected match detection means and from said external source; and
said content-addressable memory further includes a plurality of memory match signalling means for receiving said match signal from said bidirectional match signalling means and serving as said external source for providing said match signal to said bidirectional match signalling means, each one of said memory match signalling means corresponding to one of said bidirectional match signalling means, being connected to said corresponding said match signalling means in each of said content-addressable memory modules, and providing said match signal to said connected bidirectional match signalling means only when all of said connected bidirectional match signalling means are providing said match signal,
whereby said content-addressable memory responds to said clear signal provided by said memory clear signal providing means by clearing said register means only when said register means contain said stored items of data matching said pattern item of data and said register means are associated with said bidirectional match signalling means which are receiving said match signal from said memory match signalling means.

21. In the content-addressable memory of claim 19, and wherein:
said content-addressable memory module further includes means for receiving a masking item of data for specifying said pattern sequence of bits and
said simultaneous clearing means is further connected to said masking item receiving means and is responsive to said masking item of data.

22. In the content-addressable memory of claim 21, and wherein:
said masking item of data further specifies a non-pattern sequence of bits in said pattern data item;
said stored items of data further contain a second certain sequence of bits corresponding to said non-pattern sequence of bits; and
one said stored item of data matches said pattern item of data when said first certain sequence of bits matches said pattern sequence of bits, regardless of the values of bits in said second certain sequence of bits.

23. In the content-addressable memory of claim 22, and wherein:
said masking item of data specifies all said bits in said pattern item of data as said non-pattern sequence of bits,
whereby all said stored items of data match said pattern item of data, all said register means in said plurality of register means are said certain ones of said plurality of register means, and said simultaneous clearing means simultaneously clears all said register means in said plurality of register means upon receipt of said clear signal in said clear signal receiving means.

24. In the content-addressable memory module of claim 21, and wherein:
said simultaneous clearing means further includes
  (i) a plurality of means for detecting said register means containing said stored items of data matching said pattern item of data, each one of said plurality of match detection means being associated with one said register means, being responsive to said stored item of data contained in said one said register means, to said pattern item of data, and to said mask item of data, and providing a match signal when said one said register means associated with said one match detection means contains said stored item of data matching said pattern item of data,
  (ii) means for providing a register clearing signal to any one of said register means in response to said clear signal and to said match signal, and
  (iii) a plurality of means for clearing said register means, each one of said register clearing means being associated with one of said register means and being responsive to said register clearing signal;
said content-addressable memory module further includes a plurality of bidirectional match signalling means for providing said match signal from said content-addressable memory module, receiving said match signal from an external source, and providing said match signal to said register clearing signal providing means, each bidirectional match signalling means of said plurality of bidirectional match signalling means being associated with one register means of said plurality of register means and being connected to said match detection means associated with said associated register means and to said register clearing signal providing means, and each said bidirectional match signalling means providing said match signal to said register clearing signal providing means only when said bidirectional match signalling means is simultaneously receiving said match signal from said connected match detection means and from said external source; and said content-addressable memory further includes a plurality of memory match signalling means for receiving said match signal from said bidirectional match signalling means and serving as said external source for providing said match signal to said bidirectional match signalling means, each one of said memory match signalling means corresponding to one of said bidirectional match signalling means, being connected to said corresponding said match signalling means in each of said content-addressable memory modules, and providing said match signal to said connected bidirectional match signalling means only when all of said connected bidirectional match signalling means are providing said match signal, whereby said content-addressable memory responds to said clear signal provided by said memory clear signal providing means by clearing said register means only when said register means contain said stored items of data matching said pattern item of data and said register means are associated with said bidirectional match signalling means which are receiving said match signal from said memory match signalling means.

25. In the content-addressable memory of claim 24, and wherein said content-addressable memory further comprises:

an additional plurality of said content-addressable memory modules; and an additional said memory clear signal providing means connected to said clear signal receiving means in each one of said additional plurality of memory modules, and wherein each one of said plurality of memory match signalling means is further connected to said corresponding bidirectional match signalling means in each content-addressable memory module of said additional plurality of content-addressable memory modules.

26. In the content-addressable memory of claim 24, and wherein said content addressable memory further comprises:

an additional plurality of said content-addressable memory modules; and an additional plurality of memory match signalling means, each one of said additional plurality of memory match signalling means being connected to said corresponding said match signalling means in each of said content-addressable memory modules of said additional plurality of content-addressable memory modules; and wherein said memory clear signal providing means is further connected to said clear signal receiving means in each one of said additional plurality of memory modules.

27. A content-addressable memory comprising:

(1) a plurality of content-addressable memory modules, each one of said plurality of content-addressable memory modules including
 (a) a plurality of register means, each register means of said plurality of register means containing one stored item of data;
 (b) means for receiving a pattern item of data;
 (c) a plurality of means for detecting said register means containing said stored items of data matching said pattern item of data, each one of said plurality of match detection means being associated with one said register means, being responsive to said stored item of data contained in said one said register means and to said pattern item of data, and providing a match signal when said one said register means associated with said one match detection means contains said stored item of data matching said pattern item of data; and
 (d) a plurality of bidirectional match signalling means for providing said match signal from said content-addressable memory module and receiving said match signal from an external source, each one of said bidirectional match signalling means being associated with one of said register means and responsive to said match signal from said match detection means associated with said associated register means and to said match signal from said external source, and acting to provide said match signal only when simultaneously receiving said match signal from said associated match detection means and from said external source; and (2) a plurality of memory match signalling means for receiving said match signal from said bidirectional match signalling means and serving as said external source for providing said match signal to said bidirectional match signalling means, each one of said memory match signalling means corresponding to one of said bidirectional match signalling means, being connected to said corresponding said match signalling means in each of said content-addressable memory modules, and providing said match signal to said connected bidirectional match signalling means only when all of said connected bidirectional match signalling means are providing said match signal.

28. In the content-addressable memory of claim 27, and wherein said content-addressable memory further comprises:

an additional plurality of said content-addressable memory modules; and an additional plurality of said memory match signalling means, each one of said additional plurality of memory match signalling means being connected to said corresponding said match signalling means in each of said content-addressable memory modules of said additional plurality of content-addressable memory modules.

29. In the content-addressable memory of claim 27, and wherein:

said bidirectional match signalling means is a match line connected to said match detection means and clearing signal providing means;

said memory match signalling means is a memory match line connected to a corresponding said match line in each one of said content-addressable memory modules;

said match line and said memory match line provide and receive a match state and a no-match state;

said match signal is said match state; and each said match line is connected to to an open-collector driver circuit in said associated match detection means and said open-collector driver circuit places said connected match line and said connected memory match line in said no match state unless said stored item of data in said register means associated with said match detection means matches said pattern item of data.

30. In the content-addressable memory of claim 29, and wherein:
said match state is a high voltage and said no match state is a low voltage.

31. In the content-addressable memory of claim 30, and wherein:
a pattern sequence of bits in said pattern item of data corresponds to a certain sequence of bits in each one of said stored items of data, said match detection means is responsive to said pattern sequence of bits and to said certain sequence of bits, and said stored item of data matches said pattern item of data when said bits in said certain sequence match said bits in said pattern sequence.

32. In the content-addressable memory module of claim 31, and wherein:
said content-addressable memory module further includes means for receiving a masking item of data for specifying said pattern sequence of bits and
said match detection means is further connected to said masking item receiving means and is responsive to said masking item of data.

33. In the content-addressable memory module of claim 32, and wherein:
said masking item of data further specifies a non-pattern sequence of bits in said pattern data item;
said stored items of data further contain a second certain sequence of bits corresponding to said non-pattern sequence of bits; and
one said stored item of data matches said pattern item of data when said first certain sequence of bits matches said pattern sequence of bits, regardless of the values of bits in said second certain sequence of bits.

34. In the content-addressable module of claim 33, and wherein:
said masking item of data specifies all said bits in said pattern item of data as said non-pattern sequence of bits,
whereby said memory match line is in said match state when first certain memory modules of said plurality of memory modules receive said masking items of data specifying all said bits in said pattern items of data received by said first certain memory modules as said non-pattern bits, second certain memory modules of said plurality of memory modules receive said masking items not specifying all said bits in said pattern item of data as said bits, and said stored items of data in said register means associated with said memory match lines in said second certain memory modules match said pattern items received by said second certain memory items.

35. In the content-addressable memory of claim 34, and wherein said content-addressable memory further comprises:
an additional plurality of said content-addressable memory modules; and
an additional plurality of said memory match signalling means, each one of said additional plurality of memory match signalling means being connected to said corresponding said match signalling means in each of said content-addressable memory modules of said additional plurality of content-addressable memory modules.

36. In the content-addressable memory of claim 16, 19, 21, or 27, and wherein:
said content-addressable memory module further includes
address receiving means connected to said plurality of register means for receiving an encoded address specifying an addressed register means of said plurality of register means from an external source, decoding said encoded address to generate an address signal for said addressed register means specified by said encoded address, and providing said address signal to said addressed register means, each register means of said plurality of register means being responsive to said address signal; and
(2) memory register address providing means connected to each said address receiving means in said plurality of memory modules for simultaneously providing said encoded address to said address receiving means in each one of said plurality of memory modules,
whereby said encoded address provided by said memory register address providing means specifies a memory register made up of said addressed register means in each one of said plurality of memory modules.

37. In the content-addressable memory of claim 17, 18, 25, 26, 28, or 35, and wherein:
each content-addressable memory module of said plurality of content-addressable memory modules and of said additional plurality of content-addressable memory modules further includes address receiving means connected to said plurality of register means for receiving an encoded address specifying an addressed register means of said plurality of register means from an external source, decoding said encoded address to generate an address signal for said addressed register means specified by said encoded address, and providing said address signal to said addressed register means, each register means of said plurality of register means being responsive to said address signal; and
said content-addressable memory further includes memory register address providing means connected to each said address receiving means in said plurality of memory modules and to said address receiving means in said additional plurality of memory modules for simultaneously providing said encoded address to said address receiving means in each one of said plurality of memory modules and in each one of said additional plurality of memory modules.

38. In the content-addressable memory of claim 17, 18, 25, 26, 28, or 35, and wherein:
each content-addressable memory module of said plurality of content-addressable memory modules and of said additional plurality of content-addressable memory modules further includes address receiving means connected to said plurality of register means for receiving an encoded address specifying an addressed register means of said plurality of register means from an external source, decoding said encoded address to generate an address signal for said addressed register means specified by said encoded address, and providing said address signal to said addressed register means, each register means of said plurality of register means being responsive to said address signal; and
said content-addressable memory further includes
memory register address providing means connected to each said address receiving means in said plurality of memory modules for simultaneously providing said encoded address to said address receiving means in each one of said plurality of memory modules; and
additional memory register address providing means connected to each said address receiving means in said additional plurality of memory modules for simultaneously providing an additional said encoded address to said address receiving means in each one of said additional plurality of memory modules.

* * * * *